(12) United States Patent
Kang et al.

(10) Patent No.: US 12,075,946 B2
(45) Date of Patent: Sep. 3, 2024

(54) BLENDER

(71) Applicant: LG ELECTRONICS INC., Seoul (KR)

(72) Inventors: Ki Joong Kang, Seoul (KR); Daebong Yang, Seoul (KR); Inwoo Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 17/616,308

(22) PCT Filed: Sep. 4, 2020

(86) PCT No.: PCT/KR2020/011984
§ 371 (c)(1),
(2) Date: Dec. 3, 2021

(87) PCT Pub. No.: WO2021/075719
PCT Pub. Date: Apr. 22, 2021

(65) Prior Publication Data
US 2022/0304514 A1    Sep. 29, 2022

(30) Foreign Application Priority Data
Oct. 14, 2019   (KR) ........................ 10-2019-0127178

(51) Int. Cl.
*A47J 43/046* (2006.01)
*A47J 43/07* (2006.01)
*B02C 18/18* (2006.01)

(52) U.S. Cl.
CPC ......... *A47J 43/0722* (2013.01); *A47J 43/046* (2013.01); *B02C 18/18* (2013.01)

(58) Field of Classification Search
CPC ... A47J 43/0722; A47J 43/046; A47J 43/0772
See application file for complete search history.

(56) References Cited

U.S. PATENT DOCUMENTS

| | | | |
|---|---|---|---|
| 8,132,752 B1* | 3/2012 | Hotaling | A47J 43/0722 241/292.1 |
| 9,750,372 B2* | 9/2017 | Foxlee | A47J 43/085 |
| 2008/0198691 A1* | 8/2008 | Behar | A47J 43/0722 366/205 |

(Continued)

FOREIGN PATENT DOCUMENTS

| | | | | |
|---|---|---|---|---|
| CN | 206761574 U | * | 12/2017 | A47J 43/046 |
| CN | 207492674 U | * | 6/2018 | A47J 31/44 |

(Continued)

*Primary Examiner* — Faye Francis
(74) *Attorney, Agent, or Firm* — Bryan Cave Leighton Paisner LLP

(57) ABSTRACT

A blender includes a container body in which food is accommodated, a main body provided underneath the container body and supporting the container body, a container lid detachably mounted on an upper surface of the container body and opening and closing the top of the container body, and a blade assembly of which a blade chops the food inside the container body into small pieces. O more concave grooves in a shape of " ʅ " are formed in one end portion of the blade.

12 Claims, 21 Drawing Sheets

(56) References Cited

U.S. PATENT DOCUMENTS

| | | | |
|---|---|---|---|
| 2012/0080549 A1* | 4/2012 | Rukavina | A47J 43/0722 |
| | | | 241/282.1 |
| 2013/0048772 A1 | 2/2013 | Paturel | |
| 2016/0360927 A1* | 12/2016 | Behar | A47J 43/085 |
| 2017/0208999 A1 | 7/2017 | Lee | |
| 2018/0110374 A1* | 4/2018 | Hammad | A47J 43/0722 |

FOREIGN PATENT DOCUMENTS

| | | | | | |
|---|---|---|---|---|---|
| CN | 207492675 U | * | 6/2018 | | A47J 43/046 |
| CN | 108324137 A | * | 7/2018 | | A47J 43/046 |
| CN | 108991951 A | * | 12/2018 | | A47J 43/046 |
| CN | 114403725 B | * | 8/2023 | | A47J 43/046 |
| EP | 3111815 B1 | | 5/2018 | | |
| KR | 20120118136 A | * | 10/2012 | | A47J 43/046 |
| KR | 1020150019809 A | | 2/2015 | | |
| WO | WO-2018223555 A1 | * | 12/2018 | | A47J 31/44 |

* cited by examiner

BLENDER

CROSS-REFERENCE TO RELATED APPLICATIONS

This application is a National Stage filing under 35 U.S.C. 371 of International Application No. PCT/KR2020/011984, with an international filing date of Sep. 4, 2020, which claims the benefit of KR Patent Application No. 10-2019-0127178, filed on Oct. 14, 2019, all of which are incorporated by reference in their entirety herein.

TECHNICAL FIELD

The present disclosure relates to a blender and, more particularly, to a blender including a blade in which a concave groove in the shape of "⋂" is formed.

BACKGROUND

Generally, a blender is also referred to as a mixer. The blender is used primarily to chop food accommodated in a container body into small pieces or mix the food by rotating a blade by a rotational force of a motor.

In a normal blender, a main body into which the motor operating by electricity is located is positioned below, and a container body in which the food is accommodated is seated on the top of the main body. A blade for chopping the food into small pieces or mixing the food is provided inside the container body and is rotated by a rotational force generated by the motor.

After the food that needs to be chopped into small pieces is put into the container body, an operational button or a knob of the main body is used to drive the motor. The blade is rotated by the rotational force generated by the motor, and thus the food inside the container body is chopped into small pieces or mixed.

In recent years, various blenders of this type have been developed to satisfy the user's need for food intake in their busy everyday life. For example, small-sized hand-held blenders or large-sized high-volume blenders have been developed, and blenders capable of chopping food at a high speed have also been developed.

However, when a container body structure or a blade structure in the related art is employed, it takes a long time to chop the food into small pieces. Furthermore, the food is neither properly chopped into small pieces, nor properly mixed.

For example, a cutter for a mixer is disclosed in Korean Patent No. 10-1219753. In the related art, two cutters (blades) are formed symmetrically in the leftward-rightward direction and are mounted horizontally.

Therefore, the cutters (blades) are rotated in a state of being in parallel with a bottom surface of a container body. Thus, only the food positioned in a lower portion of the container body is chopped into small pieces in a concentrated manner. Accordingly, the entire food is neither properly chopped into small pieces, nor properly mixed. Consequentially, it takes a long time to completely chop the food into small pieces.

In addition, Korean Paten No. 10-1384979 discloses a blade that provides an improved performance over the cutter described above. That is, four blades are provided, two in the forward-backward direction and two in the leftward-rightward direction. The four blades are mounted in the downward direction, as well as in the horizontal direction. However, in this structure, the blades are mounted in a flat manner, and thus the food slides off or passes a blade edge. Thus, it is difficult to reliably chop the food into small pieces. Consequently, it takes a considerable amount of time to completely chop the food into small pieces.

Furthermore, U.S. Pat. No. 8,132,752 B1 discloses a blade formed in the shape of a crescent moon. The disclosed blade has a blade edge in a convex shape, instead of a concave shape, in order to effectively chop a solid object, such as ice.

Therefore, because the blade cannot trap the food in a concave groove in the blade to chop the food into smaller pieces, the food collides with a protruding portion of the blade and bounces off the protruding portion without being chopped into small pieces. A structure of this blade is effective in chopping a solid object, such as ice, into small pieces, but decreases the performance of chopping general food into small pieces.

U.S. Pat. No. 9,560,936 B2 recently issued discloses a blade that has a bent shape. However, because this blade has a bent shape when viewed as a whole, the food (particularly, small-sized food) may also not be chopped into small pieces by a blade edge and may radially deviate therefrom.

SUMMARY

An objective of the present disclosure, which is made to solve the problems in the related art as described above, is to provide a blender including an auxiliary blade, as well as a main blade.

Another objective of the present disclosure is to provide a blender including an auxiliary blade of which a blade portion is positioned between each of the main blades.

Still another objective of the present disclosure is to provide a blender including a blade assembly that facilitates moving of food inside a container body.

Still another objective of the present disclosure is to provide a blender including a blade which food does not bounce off, thereby improving the efficiency of chopping the food into small pieces.

Still another objective of the present disclosure is to provide a blender including a blade having a groove in which the food is trapped and is chopped into small pieces.

TECHNICAL SOLUTION

A feature of a blender according to the present disclosure that accomplishes the above-described objectives is that a concave groove in the shape of "⋂" is formed in one end portion of a blade that constitutes a blade assembly. Therefore, the food is trapped in the concave groove, and thus is chopped into small pieces.

Another feature of the blender according to the present disclosure is that the concave groove in the shape of "⋂" is formed in an inclined surface of a blade so that a thickness of the blade gradually decreases going toward an end of the inclined surface. Therefore, an area of the blade with which the food comes into contact is increased, and thus the efficiency of chopping the food into small pieces is improved.

Still another feature of the blender according to the present disclosure is that a blade assembly includes a main blade on which a plurality of main blade portions is formed and an auxiliary blade on which an auxiliary blade portion is formed in such a manner as to be positioned between each of the plurality of main blade portions, and that a concave groove is formed in at least one of the main blade portion and the auxiliary blade portion. Therefore, the advantage of increasing the efficiency of mixing the food and chopping the food into small pieces is significantly provided.

According to an aspect of the present disclosure, there is provided a blender including: a container body in which food is accommodated; a main body provided underneath the container body and supporting the container body; a container lid detachably mounted on an upper surface of the container body and opening and closing the top of the container body; and a blade assembly of which a blade chops the food inside the container body into small pieces, wherein one or more concave grooves in the shape of "⌒" are formed in one end portion of the blade.

In the blender, the concave groove may be formed in an inclined surface of the blade so that a thickness of the blade gradually decreases going toward an end of the inclined surface.

In the blender, the concave groove may include: a straight-line portion extending in a straight line; and a curvature portion extending from an end portion of the straight-line portion and rounded with a radius of curvature.

In the blender, the straight-line portion may be formed in such a manner as to have a greater length than the curvature portion.

In the blender, the blade assembly may include: a main blade on which a plurality of main blade portions is formed; and an auxiliary blade on which an auxiliary blade portion is formed in such a manner as to be positioned between each of the plurality of main blade portions, wherein the concave groove may be formed in at least one of the main blade portion and the auxiliary blade portion.

In the blender, the concave groove may be formed in a leading edge, as a blade edge, of the main blade portion or the auxiliary blade portion.

In the blender, the main blade portion may be obliquely formed so that a leading edge part of the main blade portion has a greater height than a rear edge part thereof.

In the blender, the plurality of main blade portions may be formed in such a manner as to make different angles with the main fixation portion.

In the blender, at least one of the plurality of main blade portions may be formed on the main fixation portion in such a manner that extends upward or downward at a predetermined inclined angle therefrom. Thus, an area where the food is chopped into small pieces is increased, and the efficiency of chopping the food into small pieces is improved.

ADVANTAGEOUS EFFECTS

A blender according to the present disclosure provides the following effects.

Firstly, according to the present disclosure, in addition to a main blade, an auxiliary blade is further provided on a blade assembly that chops the food into small pieces. Therefore, the food is chopped twice into small pieces and is mixed: the first time by the auxiliary blade and the second time by the main blade. Thus, the advantage of improving the efficiency of chopping the food into small pieces is provided.

Secondly, according to the present disclosure, a blade portion of the auxiliary blade is positioned between each of the blade portions of the main blade. Therefore, the food inside a container body sequentially collides with the blade portion of the auxiliary blade and the blade portion of the main blade, and thus is chopped into small pieces. Thus, the advantage of reducing load on a motor assembly is provided. That is, the effect of chopping the food into small pieces and mixing the food under much less load than when the food is chopped one time into small pieces and is mixed is achieved.

Thirdly, according to the present disclosure, the auxiliary blade portion of the auxiliary blade is configured in such a manner as to have a smaller length than the main blade portion of the man blade. Therefore, food of a predetermined size is first positioned between each of the main blade portions, and some amount of the food is chopped into small pieces by the auxiliary blade portion. Then, the entire food is chopped into small pieces by the main blade portion, or much more amount of the food is chopped into pieces than when chopped into small pieces by the auxiliary blade portion. Thus, the advantage of preventing a malfunction or an error due to overload on the blade assembly is provided.

Fourthly, according to the present disclosure, the auxiliary blade portion of the auxiliary blade is configured in such a manner to extend upward at a greater inclined angle than the main blade portion of the main blade. That is, the auxiliary blade portion is positioned at a greater height and more toward a central position than the main blade portion. Therefore, the auxiliary blade portion that extends upward at a predetermined inclined angle prevents the food from gathering around the center of the container body or whirls the food around the center thereof by chopping the food gathering around the center into small pieces. Thus, the effect of mixing the food well is achieved.

Fifthly, according to the present disclosure, an even number of main blade portions are provided in a manner that is symmetrical about the main fixation portion. Structurally, a plurality of main blade portions extend upward and downward at a predetermined inclined angle from the main fixation portion. Structurally, the auxiliary blade portion extends upward at a greater inclined angle therefrom. Therefore, an area of the blade portion of the blade assembly by which the food is chopped into small pieces is expanded to a lower portion or a center portion of the container body. Thus, the advantage of increasing the efficiency of chopping the food into small pieces is provided.

Sixthly, according to the present disclosure, the blade that constitutes the blade assembly is formed in such a manner that a leading edge thereof has a smaller thickness than a center portion thereof. That is, an inclined surface is formed at the leading edge of the blade so that a thickness of the blade gradually decreases going toward an end of the leading edge. Therefore, the inclined surface of the leading edge facilitates the chopping of the food into small pieces. Thus, the effect of reducing load on devices (the motor assembly and the like) is achieved.

Seventhly, according to the present disclosure, the leading edge of the blade has a plurality of concave-convex surfaces in the shape of "⌒". That is, one or more concave grooves in the shape of "⌒" are formed in the leading edge of the blade. Therefore, a contact area of the leading edge of the blade with which the food comes into contact is expanded. Thus, the advantage of improving the efficiency of chopping the food into small pieces is provided.

Eighthly, according to the present disclosure, the concave groove in the shape of "⌒" is formed in the leading edge of the blade. Therefore, the food (particularly, a lump of food that has a smaller size than the concave groove) is introduced into the concave groove in the leading edge of the blade and is chopped into small pieces without deviating therefrom. Thus, the advantage of improving the efficiency of chopping the food into small pieces is provided.

Ninthly, according to the present disclosure, the concave groove in the shape of "⌒" that is formed in the leading edge of the blade is formed in such a manner as to include a straight-line portion and a curvature portion. Therefore, the food sliding off the straight-line portion is also trapped in the curvature portion, and thus is chopped into small pieces. In this manner, the curvature portion formed on the concave groove in the shape of "⌒" grabs the food, and then obliquely chops the food. Accordingly, the food is chopped into small pieces with less force without deviating from the curvature portion. Thus, the advantage of decreasing load on the motor assembly is provided.

DETAILED DESCRIPTION

A blender according to the present disclosure will be described in detail below with reference to the accompanying drawings.

Figure 1:
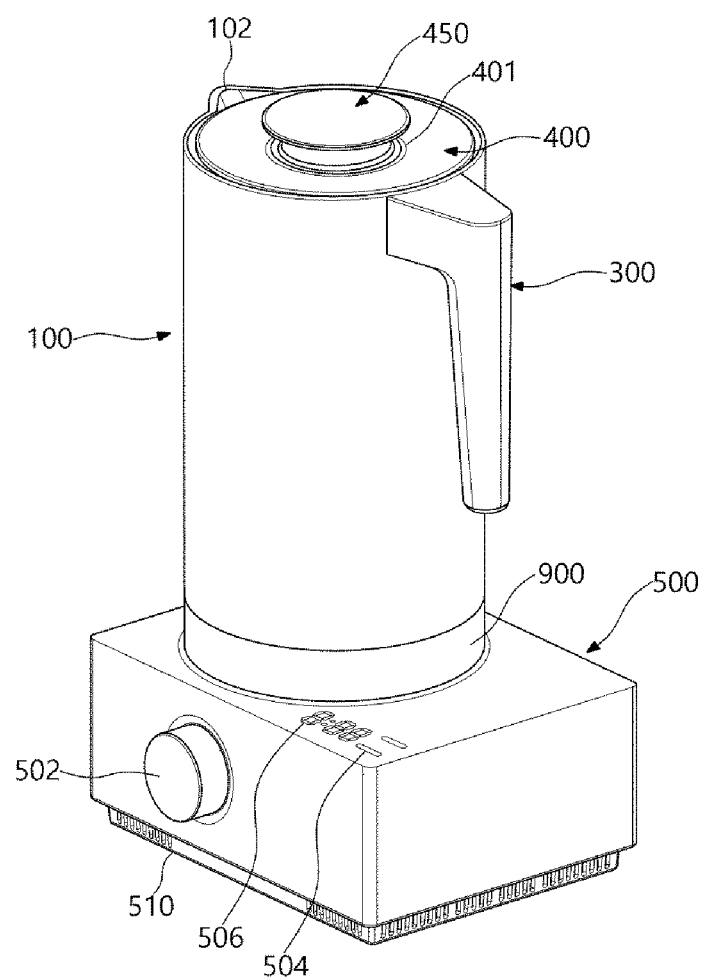
FIG. 1 is a perspective view illustrating a blender according to a desired embodiment of the present disclosure.
Figure 2:
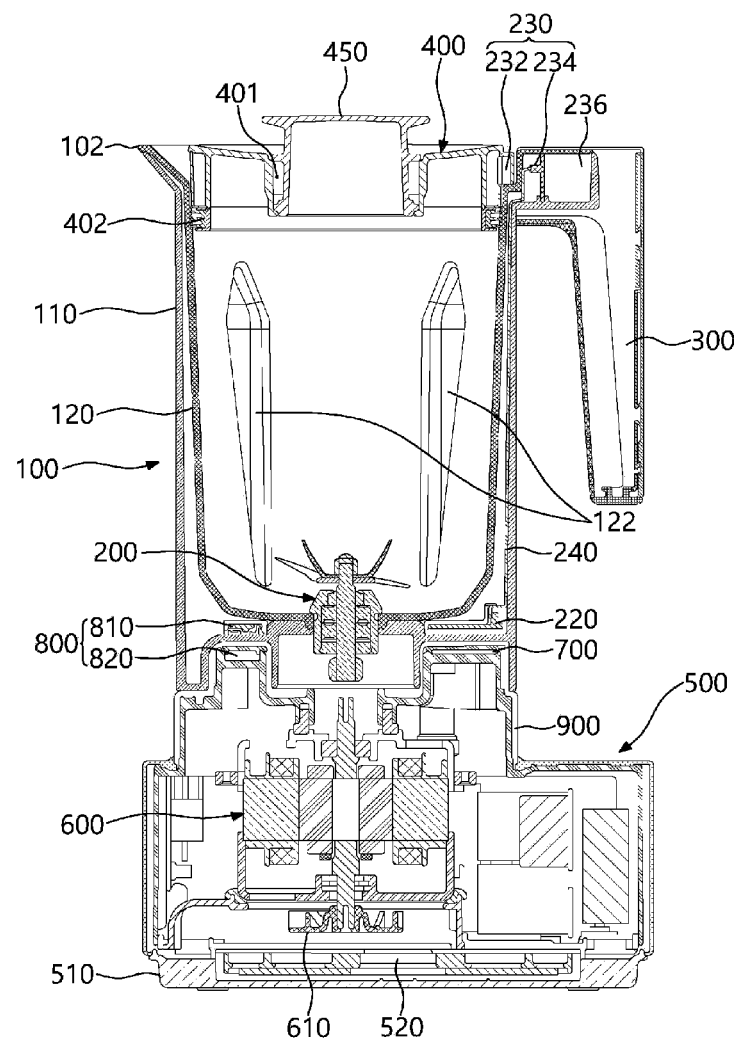
FIG. 2 is a longitudinal cross-sectional view illustrating an internal configuration of the blender according to the embodiment of the present disclosure.

FIG. 1 is a perspective view illustrating a blender according to an embodiment of the present disclosure. FIG. 2 is a longitudinal cross-sectional view illustrating the blender to the embodiment of the present disclosure.

As illustrated in FIGS. 1 and 2, the blender according to the present disclosure is configured to include a container body 100, a main body 500, and the like. The container body 100 is positioned at a relatively great height and accommodates food. The main body 500 is provided underneath the container body 100 and supports the container body 100.

The food is accommodated to the container body 100 and is chopped into pieces or mixed there. The main body 500 supports the container body 100. A plurality of components that control food chopping and mixing in the container body 100, supply electric power, and perform other functions are provided inside the main body 500.

It is desirable that the entire container body 100 has the shape of a cylinder when viewed as a whole. The container body 100 is configured to be open at the top. Thus, the food may be inserted into and taken out of the container body 100.

It is desirable that the container body 100 is made of a transparent material in such a manner that the inside thereof may be viewed from the outside. That is, the container body 100 is made of glass or transparent plastic in such a manner that a user may visually check a state of the food inside the container body 100 from the outside.

A blade assembly 200 is mounted on the inside bottom of the container body 100. A plurality of blades are rotatably mounted in the blade assembly 200 and chop the food accommodated in the container body 100 into small pieces or mix the food.

The blade assembly 200 is configured in such a manner as to be connected to the motor assembly 600 described below and to be rotatable by a rotational force generated by the motor assembly 600.

It is desirable that the wall and the bottom of the container body 100 are formed in a double-layered manner. That is, the container body 100 is configured to include an outer container body 110 that provides an exterior appearance of the container body 100 and an inner container body 120 that is positioned inward from the outer container body 110. In a case where the outer container body 110 and the inner container body 120 are configured in such a manner as to be brought into contact with each other or in such a manner as to be spaced apart from each other, it is also possible that the outer container body 110 and the inner container body 120 are mounted in such a manner as to be partly brought into contact with each other.

One or more inner guides 122 that have a predetermined length in an upward-downward direction are provided inside the container body 100. The inner guide 122 serves to guide rotating of the food inside the container body 100. It is desirable that the inner guides 122 are symmetrically arranged in each pair in the forward-backward direction or in the leftward-rightward direction.

A handle 300 that is to be gripped with the user's hand is formed on a right-side surface of the container body 100 in a manner that protrudes rightward. It is desirable that the handle 300 is formed in such a manner that the user holds the handle 300 with their hand. According to the present disclosure, an example is illustrated where an upper end portion of the handle 300 is formed integrally with and is configured in such a manner as to be integrally combined with an upper end portion of an external surface of the container body 100.

A projection lip 102 is further formed on the upper portion of the external surface of the container body 100 in a manner that is opposite to the handle 300.

The projection lip 102, as illustrated, is formed on an upper portion of a left-side surface of the container body 100 and serves to guide discharging of the small pieces of the food inside the container body 100 in an easy manner to the outside. Therefore, it is desirable that the projection lip 102 is formed in such a manner that the nearer an upper end of the projection lip 210 is to the upper surface of the container body 100, the more the upper end thereof protrudes in the leftward direction.

The top of the container body 100 is covered by a container lid 400. That is, the container lid 400 is detachably mounted on the upper surface of the container body 100, and thus closes or opens the top of the container body 100.

The container lid 400 covers the top of the container body 100 in such a manner that the food does not get out of the container body 100 to the outside, and blocks an outside foreign material from being introduced into the container body 100.

The container lid 400 is configured in such a manner as to be attached on the upper surface of the container body 100 by the user pressing or rotating the container lid 400. A gasket 402 is further provided on an outer circumferential surface of the container lid 400 and bridges a gap between the container lid 400 and the container body 100. Of course, the gasket 402 also serves to press the container lid 400 against the upper surface of the container body 100, and thus hold the container lid 400 firmly in place.

A cap 450 is further provided on the container lid 400. That is, a cover hole 401 that is a circular hole of a predetermined size is formed in a center portion of the container lid 400 in a manner that passes through the center portion thereof from top to bottom. The cap 450 is inserted into the cover hole 401 and plugs the cover hole 401.

The cap 450, as illustrated, is mounted on the center portion of the container lid 400. The cap 450 is formed in such a manner as to have a smaller diameter than the container lid 400 when viewed as a whole. It is desirable that the cap 450 is detachably mounted on the container lid 400 by forcefully inserting the cap 450 thereinto or by rotating the cap 450.

According to the present disclosure, an example is illustrated where the cap 450 is detachably mounted on the container lid 400 by rotating the cap 450. A detailed configuration of the cap 450 is described as follows.

The cap 450 is detachably mounted on the container lid 400. Thus, the user may observe the food inside the container body 100 without the need to detach the container lid 400 in a state where only the cap 450 is detached from the container lid 400. After the cap 450 is detached, it is also possible that the food is inserted into the container body 100 or that the food inside the container body 100 is mixed using a rod or the like.

An upper end portion of the cap 450 is formed in such a manner as to protrude more upward than an upper end portion of the container lid 400. Thus, the upper end portion thereof may also serve as a container lid handle that is to be gripped by the user's hand when attaching or detaching the container lid 400.

As illustrated, the main body 500 is formed in such a manner as to have the shape of a parallelepiped when viewed as a whole. The main body 500 is provided underneath the container body 100 and supports the container body 100. A plurality of components including electronic components, such as the motor assembly 600 and a printed circuit board (PCB), is mounted inside the main body 500. Of course, the main body 500 may have an exterior appearance that can vary widely whenever necessary.

The motor assembly 600 is positioned inside a center portion of the main body 500. The motor assembly 600 is supplied with electric power from the outside, and thus generates a rotational force. The blades constituting the blade assembly 200 are rotated by the generated rotational force.

Therefore, it is desirable that a lower end of the blade assembly 200 is connected to an upper end portion of the motor assembly 600.

A knob 502 is formed on a front surface of the main body 500 in a manner that protrudes forward. The knob 502 serves to set the blender according to the present disclosure in operation. It is desirable that the knob 502 is rotatably mounted on the main body 500.

The knob 502 may also be configured in such a manner as to control a rotational speed of the motor assembly 600. That is, the knob 502 may be configured in such a manner that clockwise or counterclockwise rotation thereof changes the rotational speed of the motor assembly 600 from high to low or from low to high.

A touch operation unit 504 is provided on an upper surface of the main body 500.

The touch operation unit 504 serves to operate the blender according to the present disclosure via contact. It is desirable that the touch operation unit 504 is configured in such a manner as to perform operations, such as starting the blender and stopping the blender.

Of course, the knob 502 and the touch operation unit 504 may be configured in such a manner as to selectively perform a function of setting the blender and a function of operating the blender or in such a manner as to perform these two functions individually. That is, for convenience, according to the user's selection, one of the knob 502 and the touch operation unit 504 may be configured in such a manner as to perform the function of operating the blender or the function of setting the blender.

A display unit 506 is further provided adjacent to the touch operation unit 504 (to the left side of the touch operation unit 504 in FIG. 1). That is, the display unit 506 is further provided on the upper surface of the main body 500. The display unit 506 serves to display an operating state of the blender in such a manner as to be viewed by the user from the outside. Therefore, it is desirable that the display unit 506 is configured as a seven-segment display.

A cooling fan 610 is further provided below the motor assembly 600.

The cooling fan 610 is connected to a lower end portion of the motor assembly 600, and thus is rotated by the rotational force generated by the motor assembly 600. Accordingly, outside air is forced to be introduced into the main body 500. In this manner, the cooling fan 610 introduces air into the main body 500 from the outside. Thus, the cooling fan 610 serves to cool components, such as a PCB, that are provided inside the main body 500.

A base support 510 is further provided on a lower surface of the main body 500.

The base support 510 is formed in such a manner as to protrude downward from a bottom surface of the main body 500. A space of a predetermined size is formed inside the base support 510. A wireless electric power module 520 is accommodated in this space. The wireless electric power module 520 is supplied with electric power from the outside in a wireless manner that uses an induced electromotive force and serves to supply the electric power to the motor assembly 600 inside the main body 500.

A detection system is further provided in the main body 500, the container body 100, and the like. The detection system detects whether or not the container lid 400 is attached on the upper surface of the container body 100.

An electric circuit (not illustrated) capable of being turned on and off is provided on the container body 100. The electric circuit forms a closed circuit. Thus, it is desirable that the detection system is configured in such a manner as to detect whether electric current flows through the closed circuit by a voltage supplied from the main body 500.

More specifically, the detection system is configured to include an electric power transmission unit 700, an electric power reception unit 220, an opening and closing unit 230, a transparent electrode film 240, a detection unit 800, and the like. The electric power transmission unit 700 is provided in the main body 500 and supplies electric power to the container body 100. The electric power reception unit 220 is provided in the container body 100 and receives the electric power supplied from the electric power transmission unit 700. The opening and closing unit 230 is provided on an upper end portion of the container body 100 and opens and closes an electric circuit formed in the container body 100 according to whether or not the lid 400 covers the top of the container body 100. The transparent electrode film 240 is made of a transparent material and is provided on one surface of the container body 100. The transparent electrode film 240 is connected to the electric power reception unit 220 and the opening and closing unit 230 in a manner that allows electricity to flow therebetween. The detection unit 800 is provided on one side of the main body 500 or the container body 100 and detects whether or not electric current flows through a closed circuit formed by the electric circuit connected to the electric power reception unit 220 and the opening and closing unit 230.

The electric power transmission unit 700 serves to transfer the electric power supplied to the main body 500 from the outside of the main body 500 or the electric power pre-stored in the main body 500 itself to the container body 100. It is desirable that an induction coil or the like where an induced electromotive force can occur is used as the electric power transmission unit 700.

The electric power reception unit 220 serves to receive the electric power transmitted from the main body 500 and has a structure corresponding to that of the electric power transmission unit 700. That is, it is desirable that the electric power reception unit 220 is configured as a coil in such a manner that, by the induced electromotive force, the electric power is transferred between the electric power transmission unit 700 and the electric power reception unit 220.

It is desirable that the electric power transmission unit 700 and the electric power reception unit 220 are positioned adjacent to each other in such a manner as to generate the induced electromotive force. Therefore, according to the present disclosure, a case is illustrated where the electric power transmission unit 700 is mounted on an upper right end portion of the main body 500 and where the electric power reception unit 220 is mounted on a lower right end portion of the container body 100.

The turning-on and -off unit 230 serves to turn on and turn off the electric circuit (not illustrated) formed in the container body 100 according to whether or not the container lid 400 covers the top of the container body 100. The turning-on and -off unit 230 is configured to include a permanent magnet 232, and a reed switch 234 that are provided in the container lid 400 and the container body 100, respectively, and the like.

As illustrated in FIG. 2, according to the present disclosure, a case is illustrated where the permanent magnet 232 is mounted on a right edge of the container lid 400 and where the reed switch 234 is mounted on the upper end portion (a portion of the handle 300) of the container body 100.

More specifically, it is desirable that the reed switch 234 is mounted in such a manner as to be accommodated in a switch groove 236 formed in the upper end portion of the handle 300.

The reed switch consists of a pair of ferromagnetic flexible metal contacts in a hermetically sealed glass envelope. The contacts are open when a magnetic field is applied. The configuration of the reed switch is well known in the related art. Therefore, a further detailed description of the configuration and principle of the reed switch is omitted.

Of course, instead of the permanent magnet 232 and the reed switch 234, it is also possible that a different electric turning-on and -off unit or a mechanical structure is used, as the turning-on and -off unit 230, to turn on and off the electric circuit. It is also possible that the permanent magnet 232 and the reed switch 234 are mounted on the container lid 400 and the container body 100, respectively.

Various types of electric devices, various types of structures, or the like, if they have a function of being able to detect whether or not electric current flows by the turning-on and -off unit 230 through the electric circuit formed in the container body 100, may be used as the detection unit 800. According to the present disclosure, the detection unit 800 is described by taking, as an example, detection of light that uses a photosensor or photodetector.

Therefore, the detection unit 800 is configured to include an optical transmission module 810, an optical reception module 820, and the like. The optical transmission module 810 is provided in the container body 100 and generates light. The optical reception module 820 is provided in the main body 500 and receives the light transmitted by the optical transmission module 810.

It is desirable that the optical transmission module 810 and the optical reception module 820 are positioned adjacent to each other. According to the present disclosure, as illustrated, the optical transmission module 810 is positioned on a lower left end portion of the container body 100, and the optical reception module 820 is positioned on an upper left end portion of the main body 500.

It is desirable that a light emitting diode (LED) or the like that generates light using electricity is used as the optical transmission module 810. It is desirable that a photosensor, a photodetector, or the like that receives light and converts the received light into an electric signal is used as the optical reception module 820.

Then, the transparent electrode film 240 is provided between the outer container body 110 and the inner container body 120. More specifically, it is desirable that the transparent electrode film 240 is mounted on an internal surface of the outer container body 110.

The transparent electrode film 240 is made of a transparent material, such as indium-tin oxide (ITO), and is attached on a surface of the container body 100. The turning-on and -off unit 230 provided on the upper end portion of the container body 100 is also connected to the electric power reception unit 220 and the optical transmission module 810, which are provided on a lower end portion of the container body 100, thereby constituting the electric circuit.

In this manner, the transparent electrode film 240 is attached on the surface of the container body 100 made of a transparent material in a manner that extends longitudinally in the upward-downward direction. Thus, the transparent electrode film 240 serves to guide transfer of an electric signal between upper and lower end portions of the container body 100.

When the container body 100 and the transparent electrode film 240 are both made of a transparent material, the transparent electrode film 240 is not visually exposed to the outside. Thus, the transparent electrode film 240 does not spoil the exterior appearance of the container body 100, and a design of the container body 100 is maintained as is.

Then, in a case where the transparent electrode film 240 is attached on the surface of the container body 100, a hole may be formed in the transparent electrode film 240. The hole serves to remove a bubble occurring between the transparent electrode film 240 and the surface of the container body 100 on which the transparent electrode film 240 is attached. That is, in order to prevent the bubble from occurring, it is desirable that a hole is drilled through a center portion of the transparent electrode film 240 made of ITO in such a manner that the bubble escapes therethrough.

A seating support 900 is formed on the upper surface of the main body 500 in such a manner as to protrude upward therefrom.

The seating support 900 is formed to a circular shape that corresponds to a shape of the lower end portion of the container body 100. The lower end portion of the container body 100 is seated in the upward-downward direction on the seating support 900 in a manner that is removable therefrom.

The container body 100 is formed in a double-layered layer. That is, the container body 100 is configured to include the outer container body 110 and the inner container body 120. It is desirable that the inner guide 122 is formed in such a manner as to protrude inward from an internal surface of the inner container body 120.

A configuration of the container body 100 will be described in detail below.

Figure 3:
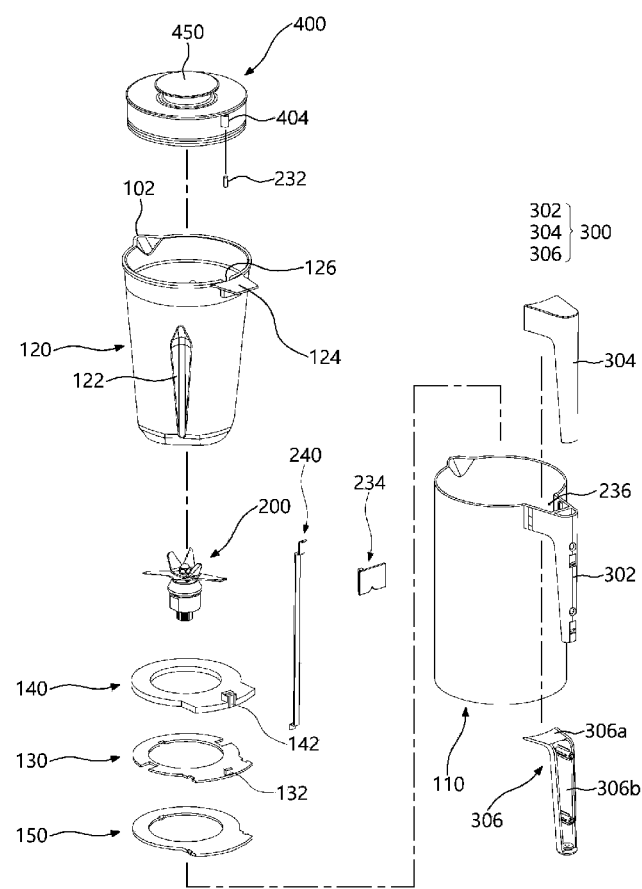
FIG. 3 is an exploded perspective view illustrating a detailed configuration of a container body that constitutes the blender according to an embodiment of the present disclosure.
Figure 4:
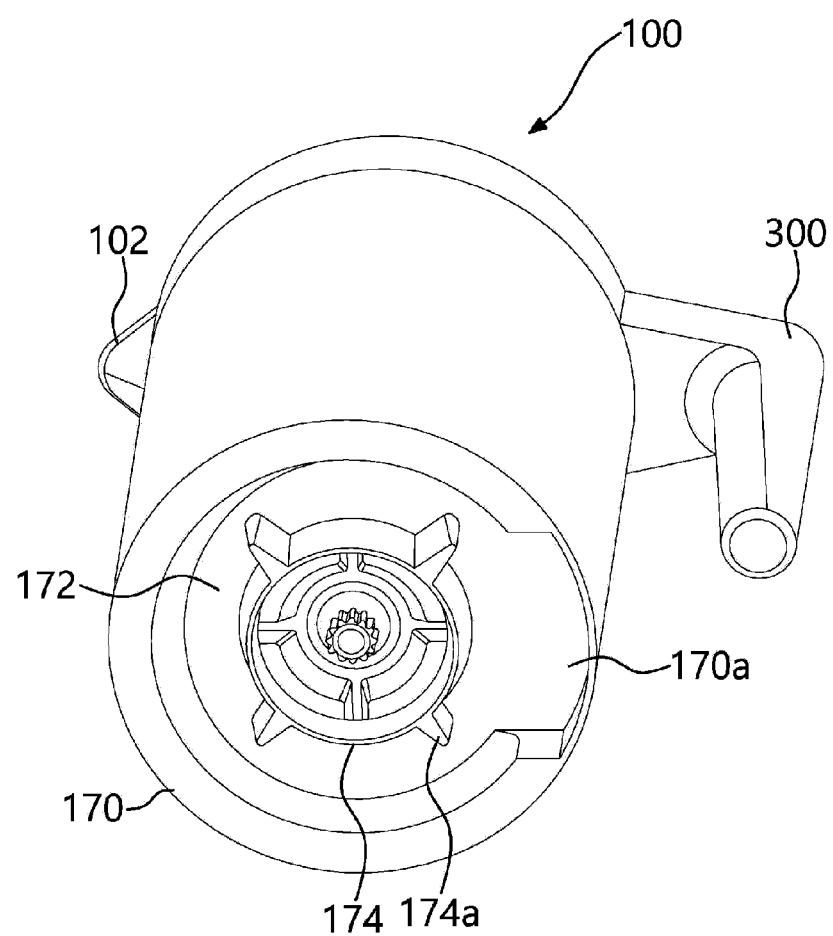
FIG. 4 is a perspective view illustrating the container body that constitutes the blender according to the embodiment of the present disclosure, when viewed from below.

FIG. 3 is an exploded perspective view illustrating a container body 100. FIG. 4 is a perspective view illustrating the container body 100, when viewed from below.

As illustrated in FIGS. 3 and 4, the container body 100 is formed to a cylindrical shape when viewed as a whole and is formed in a double-layered manner. That is, the container body 100 is configured to include the outer container body 110 that provides the exterior appearance of the container body 100 and the inner container body 120 that is positioned inward from the outer container body 110.

It is desirable that the container body 100, that is, the outer container body 110 and the inner container body 120 are made of a transparent material. That is, it is desirable that the outer container body 110 and the inner container body 120 are made of a transparent material, such as glass, polycyclohexylenedimethylene terephthalate (PCT), transparent plastic in such a manner that the user may visually check the state of the food inside the container body 100 from the outside.

The outer container body 110 provides the exterior appearance of the container body 100. It is desirable that the external container body 110 is formed to a cylindrical shape that has upper and lower portions of the same size. A main handle 302 is formed in such a manner as to protrude rightward from a right-side external surface of the outer container body 110. The main handle is to be gripped with the user's hand.

The main handle 302 is formed to the shape of "¬". An upper end portion of the main handle 302 is connected to an upper right end portion of the outer container body 110. It is desirable that the main handle 302 is formed by injection molding in such a manner as to be integrally combined with the outer container body 110. In this manner, the main handle 302 has relatively more improved strength and durability in terms of an advantage when formed by injection molding in such a manner as to be integrally combined with the outer container body 110 than when jointed or fixed, as a separate single component, to the outer container body 110.

The switch groove 236 in which the reed switch 234 is accommodated is formed in a portion of the main handle 302 that is connected to the container body 100. That is, the switch groove 236 is formed in the upper end portion of the main handle 302 and provides a space in which the reed switch 234 is mounted. The switch groove 236 is open at the left side.

An exterior handle 304 and an internal handle 306 are further provided in such a manner as to extend outward from the main handle 302. That is, as illustrated, the exterior handle 304 is provided to the right side of the main handle 302, and the internal handle 306 is provided to the left side thereof.

More specifically, like the main handle 302, the exterior handle 304 is also formed to the shape of "¬" when viewed as a whole. The exterior handle 304 is formed in such a manner as to enclose an upper surface, a right-side surface, and front and rear surfaces of the main handle 302. It is desirable that the exterior handle 304 is made of a less-unbreakable antirust material having a smooth surface, such as a stainless steel material. This formation of the exterior handle 304 provides a visually aesthetic impression to a consumer.

The internal handle 306 encloses a left-side surface and a bottom surface of the main handle 302. The internal handle 306 is formed to the shape of "¬" that corresponds to a shape of the bottom surface of the main handle 302. It is desirable that at least one portion of the internal handle 306 is made of an elastic material.

Specifically, the internal handle 306 is configured to include a connection portion 306a, a grip portion 306b, and the like. The connection portion 306a encloses a lower part of the upper end portion of the main handle 302. The grip portion 306b is formed in such a manner as to extend downward from the connection portion 306a and encloses the left-side surface of the main handle 302.

It is desirable that, like the external handle 304, the connection portion 306a is made of a less-breakable material having a smooth surface. The grip portion 306b is covered by the user's fingers. Thus, it is desirable that the grip portion 306b is made of an elastic material. That is, it is desirable that the connection portion 306a is made of a stainless material. The grip portion 306b is covered by the user's four fingers (other than the thumb). Thus, it is desirable that grip portion 306b is made of an elastic material, such as rubber, that provides a sense of smooth touch to the user.

The inner container body 120 is formed in such a manner as to have a smaller size (diameter) than the outer container body 110 and is seated inside the outer container body 110.

The inner container body 120 is formed to a cylindrical shape that is open at the top. More specifically, as illustrated, the nearer a cross section of the inner container body 120 is to the bottom, the more decreased a diameter thereof. That is, the inner container body 120 is formed in such a manner as to be tapered to the bottom.

A plurality of inner guides 122 as described above is formed in the upward-downward direction in an external surface of the inner container body 120. The blade assembly 200 and the like are mounted on a lower end portion of the inner container body 120.

The projection lip 102 is formed on an upper left end portion of the inner container body 120 in a manner that protrudes leftward. A covering container lid 124 is formed on an upper right end portion of the inner container body 120 in a manner that extends rightward.

The covering container lid 124 serves to cover the top of the switch groove 236 in the outer container body 110. The covering container lid 124 is formed to a plate that has a predetermined thickness. In order to correspond to a size of an upper end portion of the switch groove 236, the covering container lid 124 is formed in such a manner that the more a right end thereof protrudes rightward, the smaller a width thereof.

The blade assembly 200 is mounted on the lower end portion of the inner container body 120.

The blade assembly 200 serves to chop food into small pieces or mix food using the blades. The blade assembly 200 is configured in such a manner as to be rotated by the rotational force generated by the motor assembly 600. The blades and the like that chop the food into small pieces are mounted on a bottom surface of the inner container body 120 in a manner that protrudes upward therefrom.

A magnet holder 404 is further provided on the outer circumferential surface of the container lid 400. That is, as illustrated, the magnet holder 404 is formed in the outer circumferential surface of the container lid 400 in a manner that protrudes outward. The permanent magnet 232 is inserted into the magnet holder 404.

When the container lid 400 is attached on the upper surface of the container body 100 or detached therefrom, the permanent magnet 232 serves to perform control to turn on and off the reed switch 234.

A coil holder assembly is further provided between the outer container body 110 and the inner container body 120.

The coil holder assembly is configured to include a coil holder 130, an upper cover 140, a lower cover 150, and the like. An induction coil is provided on the coil holder 130. The upper cover 140 and the lower cover 150 enclose upper and lower portions, respectively, of the coil holder 130.

Specifically, the coil holder 130 is provided between a bottom surface of the outer container body 110 and a bottom surface of the inner container body 120. The electric power reception unit 220 and the optical transmission module 810 are mounted on the coil holder 130.

The coil holder 130 has the shape of a circular ring of a predetermined width when viewed as a whole. The electric power reception unit 220 is provided on a right end portion of the coil holder 130 in the shape of the circular ring. That is, although not illustrated in detail, the induction coil receiving electric power is provided on the right end portion of the coil holder 130 and constitutes the electric power reception unit 220.

The electric power reception unit 220 provided on the coil holder 130 is realized as a reception induction coil patterned in the same plane on a PCB. That is, in an implementation of the electric power reception unit 220, the reception induction coil is wound a number of times in helical form on a reception core on the PCB on the bottom surface of the coil holder 130.

The optical transmission module 810 is provided on the bottom surface of the coil holder 130.

The optical transmission module 810 emits light by electricity supplied from the electric power reception unit 220 and constitutes the detection unit 800. As described above, it is desirable that an LED or the like is used as the optical transmission module 810.

The electric power reception unit 220 and the optical transmission module 810 are electrically connected to each other. That is, the electric power reception unit 220 and the optical transmission module 810 are formed in such a manner as to form a closed circuit along with the turning-on and -off unit 230 and the like. Therefore, it is desirable that the electric power reception unit 220, the optical transmission module 810, and the like are configured in such a manner as to be electrically connected to each other by a printed circuit board or the like on the coil holder 130.

Although not illustrated, a conversion module that converts alternating current (AC) into direct current (DC) may be further provided on the coil holder 130.

A holder terminal 132 is provided on an upper surface of a right end portion of the coil holder 130.

A lower end portion of the transparent electrode film 240 is inserted into the holder terminal 132 for being connected thereto.

As illustrated, the coil holder 130 is formed to the shape of a ring when viewed as a whole. As illustrated, it is desirable that the coil holder 130 is formed in such a manner that the right end portion thereof has a relatively wide so that the electric power reception unit 220 and the like are formed on the right end portion thereof.

A hole may be formed in outer and inner circumferential surfaces of the coil holder 130. A hook for fixing a plurality of components passes through the hole.

The coil holder 130 is protected by the upper and lower covers 140 and 150. The upper cover 140 and the lower cover 150 that correspond to upper and lower surfaces, respectively, of the coil holder 130 are provided over and under the coil holder 130, respectively and enclose upper and lower portions, respectively, of the coil holder 130.

A terminal holder 142 is formed on a right end portion of the upper cover 140 in a manner that protrudes upward. The holder terminal 132 of the coil holder 130 is accommodated in the terminal holder 142. Therefore, the holder terminal 132 is inserted, from below, into the terminal holder 142 for being accommodated therein. An upper portion of the terminal holder 142 is formed in such a manner as to be open at the part thereof. The lower end portion of the transparent electrode film 240 passes through the opening.

A hook may be formed on the upper cover 140. With the hook, the upper cover 140 is combined with the lower cover 150.

As described above, the transparent electrode film 240 is made of a transparent material, such as indium-tin oxide (ITO). The transparent electrode film 240 is configured in such a manner as to have a size corresponding to a length in the upward-downward direction of the container body 100.

The transparent electrode film 240 is provided between the outer container body 110 and the inner container body 120. In this manner, the presence of the transparent electrode film 240 between the outer container body 110 and the inner container body 120 prevents a contact with the food inside the inner container body 120 and blocks an outside foreign material from coming into contact with the outer container body 110 as well.

The transparent electrode film 240 may be attached on a surface of the outer container body 110 or may be attached on a surface of the inner container body 120. That is, the transparent electrode film 240 may be attached on the internal surface of the outer container body 110 or may be attached on an external surface (outer circumferential surface) of the inner container body 120.

A case where the transparent electrode film 240 is attached on the internal surface of the outer container body 110 in a manner that extends longitudinally in the upward-downward direction is described hereinafter as an example.

The transparent electrode film 240, as illustrated, is bent one or more times. A lower end portion thereof passes through the terminal holder 142 of the upper cover 140 and is connected to the holder terminal 132 of the coil holder 130, and an upper end portion thereof is connected to the reed switch 234.

That is, a film guide on which the transparent electrode film 240 is attached is formed on the internal surface of the outer container body 110 in a manner that extends longitudinally in the upward-downward direction. That is, the film guide is formed on an internal right-side surface of the outer container body 110 in a manner that extends longitudinally in the upward-downward direction and thus guides attaching of the transparent electrode film 240.

A magnet groove 126 is formed in an upper end portion of the inner container body 120 in a manner that is cut outward. The permanent magnet 232 is accommodated in the magnet groove 126. That is, an end portion on the right side of the inner container body 120 is partly cut off rightward in such a manner as to be stepped, and thus the magnet groove 126 is formed. The permanent magnet 232 and the like are positioned in the magnet groove 126.

The container body 100 is formed in such a manner that a bottom surface thereof has a shape corresponding to a shape of the upper surface of the main body 500. With this configuration, the container body 100 is easily attached and detached on and from the upper surface of the main body 500.

More specifically, the container body 100 is seated on the seating support 900 of the main body 500 described below.

The container body 100 is formed in such a manner that the bottom surface thereof has a shape corresponding to a shape of an upper end portion of the main body 500. Thus, the container body 100 is seated on the main body 500 and is easily removed therefrom.

An edge rim 170 of a predetermined width is formed on the bottom surface of the container body 100 in a manner that protrudes downward. The edge rim 170 is brought into contact with an upper surface of a lower rim 910 of the seating support 900 on the main body 500. The edge rim 170 is formed to a shape corresponding to a shape of an upper surface of the lower rim 910. The lower rim 910 will be described below.

One part of a center portion of the bottom surface of the container body 100 is recessed in the upward direction, and thus an upper-rim accommodation groove 172 is formed. That is, the one part of the center portion of the bottom surface of the container body 100 is recessed in the upward direction inward from the edge rim 170 of the container body 100, and thus the upper-rim accommodation groove 172 is formed. When the container body 100 is seated on the main body 500, an upper rim 920 of the seating support 900 on the main body 500 is accommodated in the upper-rim accommodation groove 172. The upper rim 920 will be described below.

The edge rim 170 is formed to a shape of a circular ring that has an opening at one portion thereof. A coil seating part 940 described below is accommodated in this opening. That is, the edge rim 170 is open at the right ends, and thus a coil seating groove 170a is formed. The coil seating part 940 described below is accommodated in the coil seating groove 170a.

One part of the center portion of the bottom surface of the container body 100 protrudes downward, and thus a circular rim 174 is formed. That is, the center portion of the upper-rim accommodation groove 172 includes the circular rim 174 protruding downward.

As illustrated, the circular rim 174 has the shape of a circular ring. The circular rim 174 is open at the center. The circular rim 174 provides a path along which the blade assembly 200 and the motor assembly 600 may be connected to each other.

The circular rim 174 is accommodated in a circular-rim accommodation groove 980 formed in the main body 500. The circular-rim accommodation groove 980 will be described below.

A plurality of mounting protrusions 174a that protrude radially is further provided on an outer circumferential surface of the circular rim 174. The mounting protrusion 174a serves to hold the container body 100 firmly at its home position on the main body 500 and to keep the container body 100 stationary without being rotated. One or more mounting protrusions 174a are provided.

According to the present disclosure, a case is illustrated where four mounting protrusions 174a are provided. It is desirable that the mounting protrusion 174a is formed in such a manner that the farther an end thereof extends outward from the outer circumferential surface of the circular rim 174, the more decreased a diameter thereof. For the reason for this is to easily accommodate the mounting protrusion 174a in the protrusion groove 982 described below.

Figure 5:
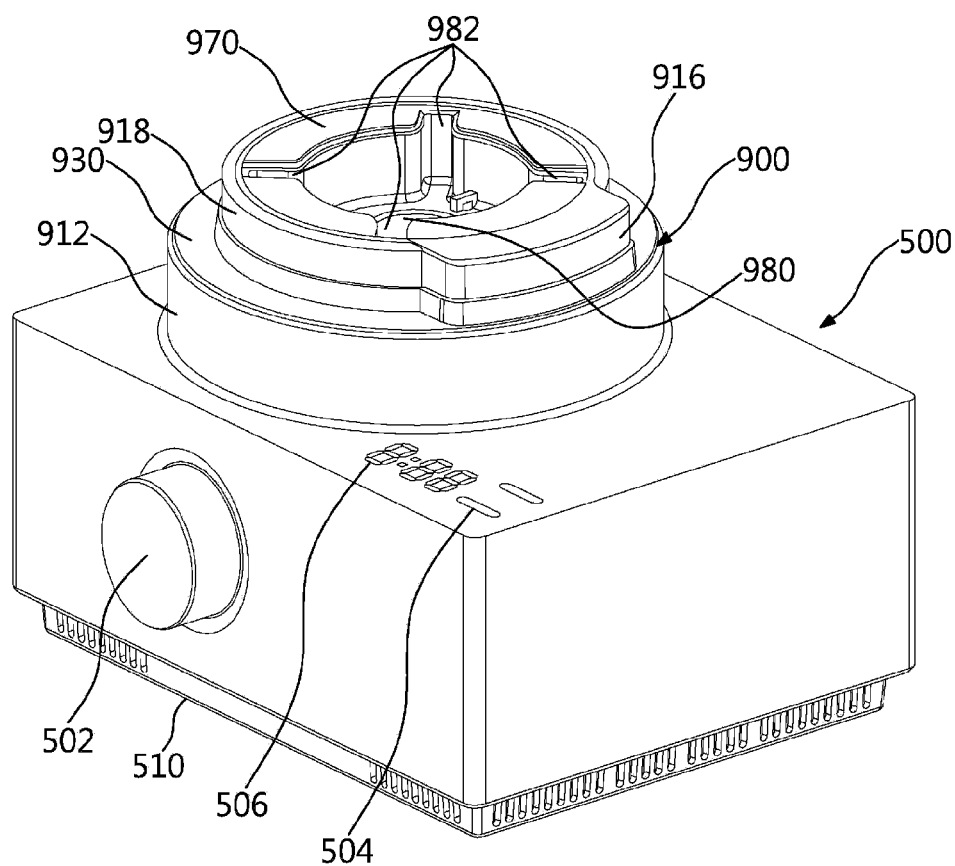
FIG. 5 is a perspective view illustrating a main body that constitutes the blender according to an embodiment of the present disclosure.
Figure 6:
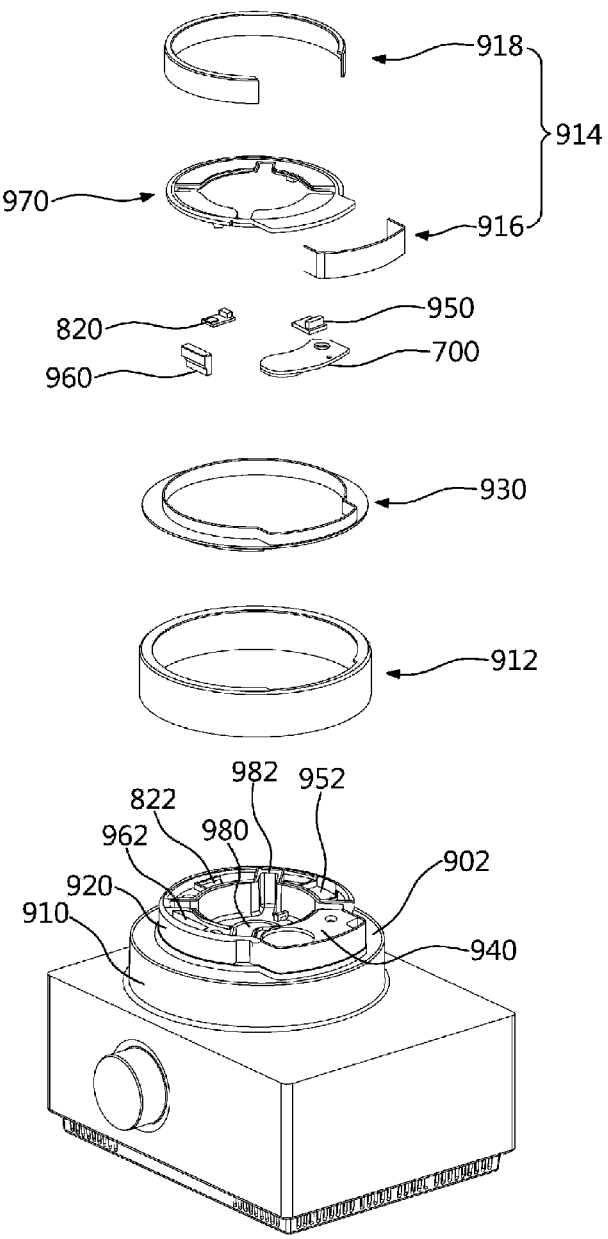
FIG. 6 is an exploded perspective view illustrating components in an upper half of the main body that constitutes the blender according to the embodiment of the present disclosure.
Figure 7:
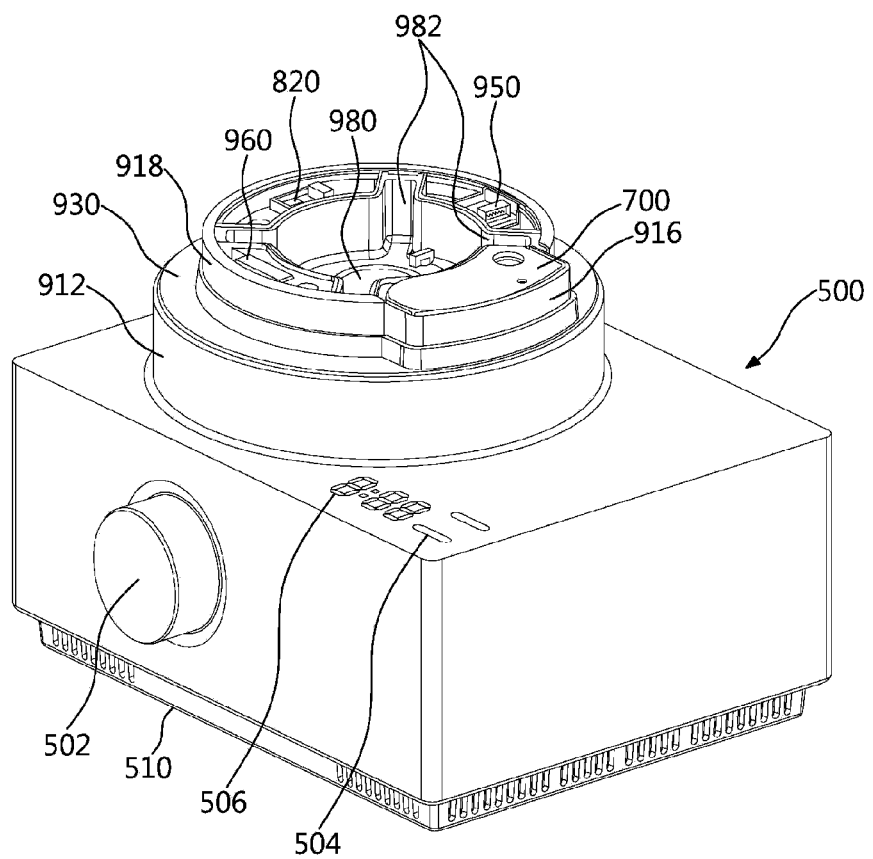
FIG. 7 is a perspective view illustrating a state where a cover is removed from the main body that constitutes the blender according to the embodiment of the present disclosure.

FIGS. 5 to 7 are views each illustrating in detail components in an upper half of the main body 500. FIG. 5 is a perspective view illustrating the main body 500. FIG. 6 is an exploded perspective view illustrating the components in the upper half of the main body 500. FIG. 7 is a perspective view illustrating a state where a cover is removed from the main body 500.

As illustrated in FIGS. 5 to 7, the seating support 900 is provided on the upper surface of the main body 500 in a manner that protrudes upward to be stepped. The bottom of the container body 100 is seated on the seating support 900.

The lower end portion of the container body 100 is seated on the seating support 900 and is supported thereon. Therefore, it is desirable that the seating support 900 is formed in such a manner as to have a shape corresponding to a shape of the lower end portion of the container body 100.

Specifically, the seating support 900 is configured to include the lower rim 910, the upper rim 920, and the like. The lower rim 910 is formed in such a manner as to be stepped and has a diameter corresponding to a diameter of the lower end portion of the container body 100. The upper rim 920 is formed in such a manner as to protrude upward from the lower rim 910 and has a smaller diameter than the lower rim 910.

As illustrated, the lower rim 910 is formed in such a manner as to have a circular shape and a predetermined height. The upper rim 920 having a smaller diameter than the lower rim 910 is formed on the upper surface of the lower rim 910 in such a manner as to protrude upward therefrom to a predetermined height. Therefore, it is desirable that a step surface 902, like the upper surface of the main body 500, is in the horizontal plane formed between the lower rim 910 having a relatively great diameter and the upper rim 920 having a relatively small diameter.

An exterior ring 912 and an upper end ring 914 are provided on external surfaces, respectively, of the lower rim 910 and the upper rim 920. The exterior ring 912 and an upper end ring 914 have shapes corresponding to shapes, respectively, of the external surfaces of the lower rim 910 and the upper rim 920. The exterior ring 912 and the upper end ring 914 are provided on outer circumferential surfaces, respectively, of the lower rim 910 and the upper rim 920 that have a circular external surface, and thus enclose external surfaces (flank surfaces), respectively, of the lower rim 910 and the upper rim 920.

The exterior ring 912 and the upper end ring 914 serve to protect components inside and serve as an exterior material. Therefore, it is desirable that like the exterior handle 304, the exterior ring 912 and the upper end ring 914 are made of an antirust material having a smooth surface, such as a stainless steel material.

An elastic member 930 made of an elastic material is further provided on the step surface 902 between the upper rim 920 and the lower rim 910. It is desirable that as illustrated, the elastic member 930 is formed in such a manner as to cover the step surface 902 formed on the upper surface of the lower rim 910 and to enclose a lower portion of the upper rim 920.

The elastic member 930 is made of an elastic material and thus serves as a cushion that absorbs shock when the container body 100 is placed on the main body 500. That is, when the bottom surface of the container body 100 is brought into contact with the upper rim 920, the elastic member 930 also serves to prevent the upper rim 920 and the lower rim 910 on the main body 500, which are made of a solid material, and the bottom surface of the container body 100 from being damaged or from generating noise due to collision with each other.

In this manner, the elastic member 930, made of a material, such as rubber, is used to smoothly seat the container body 100 on the main body 500 without any shock. In addition, conductivity rubber may be used whenever necessary. In this case, conductivity rubber may also be provided on the bottom of the container body 100.

The electric power transmission unit 700 and the optical reception module 820 are mounted on an upper surface of the upper rim 920.

More specifically, a right-side surface of the upper rim 920 further protrudes rightward, and the coil seating part 940 is formed on the right-side surface thereof. The electric power transmission unit 700 is mounted on an upper surface of the coil seating part 940.

The electric power transmission unit 700 is positioned adjacent to the electric power reception unit 220 provided on the container body 100 and serves to supply electric power to the electric power reception unit 220. Therefore, it is desirable that the electric power transmission unit 700 is configured as an induction coil. That is, like the electric power reception unit 220, the electric power transmission unit 700 may be configured as an induction coil wound a number of times in helical form on a core (not illustrated) on the same surface and may be mounted on a PCB.

In addition, although not illustrated in detail, an oscillation circuit unit may be provided inside the main body 500. The oscillation circuit unit may generate electric power and may apply electric current to the electric power transmission unit 700. A magnetic field may be produced by the electric current applied to the electric power transmission unit 700. Then, the oscillation circuit unit may change strength of the electric current that is applied to the electric power transmission unit 700, and the change in the strength of the electric current changes the magnetic field in the electric power transmission unit 700.

Therefore, according to the present disclosure, when the electric power reception unit 220 and the electric power transmission unit 700 are mounted in such a manner as to correspond to each other in the upward-downward direction, the strength of the electric current that is applied to the electric power transmission unit 700 is changed, and the magnetic field in the electric power transmission unit 700 is accordingly changed. Thus, inductive coupling between the electric power transmission unit 700 and the electric power reception unit 220 changes magnetic flux passing through the electric power reception unit 220. Consequently, an induced electromotive force develops in the electric power reception unit 220. This induced electromotive force may also be supplied to the optical transmission module 810.

The optical reception module 820 is provided in a direction opposite to a direction of the electric power transmission unit 700. That is, it is desirable that the optical reception module 820 is provided in a reception groove 822 formed in an upper surface of a left end portion of the upper rim 920. The reception groove 822 is positioned in a manner that corresponds in the upward-downward direction to the optical transmission module 810 mounted on the container body 100.

More specifically, the reception groove 822 of a predetermined size is formed in the upper surface of the left end portion of the upper rim 920 in a manner that is cut downward. The optical reception module 820 is fixedly mounted in the reception groove 822.

It is desirable that the optical reception module 820, as described above, includes a photosensor or photodetector. The optical reception module 820 may receive light transmitted by the optical transmission module 810 and may transmit this received optical signal.

A Hall sensor 950 and a container body detection switch 960 may be further provided on the upper surface of the upper rim 920. That is, a container body switch groove 962 and a sensor groove 952 are formed in upper surfaces, respectively, of leading and rear edge portions of the upper rim 920 in a manner that is cut downward. The container body detection switch 960 and the Hall sensor 950 are fixedly mounted in the container body switch groove 962 and the sensor groove 952, respectively.

The container body detection switch 960 is configured as a reed switch and serves to detect whether or not the container body 100 is seated on the upper surface of the main body 500. In a case where the container body detection switch 960 is mounted, a magnet (not illustrated) corresponding to the container body detection switch 960 is also further provided on the lower end portion of the container body 100.

The Hall sensor 950 serves to determine a type of the container body 100 seated on the main body 500. In this case, a signal transfer unit that corresponds to the bottom surface of the container body 100 may also be necessary.

The upper end ring 914 is mounted an edge of the upper rim 920. It is desirable that the upper end ring 914 is configured in such a manner as to be separated into two pieces. That is, as illustrated, the right-side surface of the upper rim 920 protrudes rightward, and thus the coil seating part 940 is formed. Therefore, the upper end ring 914 is configured to include a protrusion piece 916 and a curvature piece 918. The protrusion piece 916 encloses an external surface of the coil seating part 940. The curvature piece 918 encloses portions other than the external surface thereof.

An upper portion of the upper rim 920 is covered by a cover 970. Therefore, the electric power transmission unit 700, the optical reception module 820, the container body detection switch 960, the Hall sensor 950, and the like that are mounted on the upper rim 920 are covered by the cover 970 for being protected.

A center portion of the seating support 900 is open at the top and bottom. Thus, the blade assembly 200 of the container body 100 and the motor assembly 600 built into the main body 500 are connected to each other.

More specifically, the circular-rim accommodation groove 980 is formed in a center portion of the upper rim 920 in a manner that is cut downward. The above-described circular rim 174 on a lower end of the container body 100 is accommodated in the circular-rim accommodation groove 980. That is, the upper rim 920 has the shape of a circular ring when viewed as a whole. The circular-rim accommodation groove 980 in the shape of a circle is formed in the center portion of the upper rim 920.

One or more protrusion grooves 982 are formed in an internal surface of the upper rim 920. One or more portions of the protrusion groove 982 are recessed outward, and thus one or more circular-rim accommodation grooves 980 are radially formed. The mounting protrusion 174a of the container body 100 is seated in the circular-rim accommodation groove 982.

Therefore, it is desirable that the protrusion grooves 982 are formed in such a manner that the number or sizes thereof correspond to the number or sizes of the mounting protrusions 174a and that the protrusion groove 982 is formed in such a manner that a size thereof corresponds to a size of the mounting protrusion 174a. It is desirable that the protrusion groove 982 is formed in such a manner as to have the same width as or a greater width than the mounting protrusions 174a.

Figure 8:
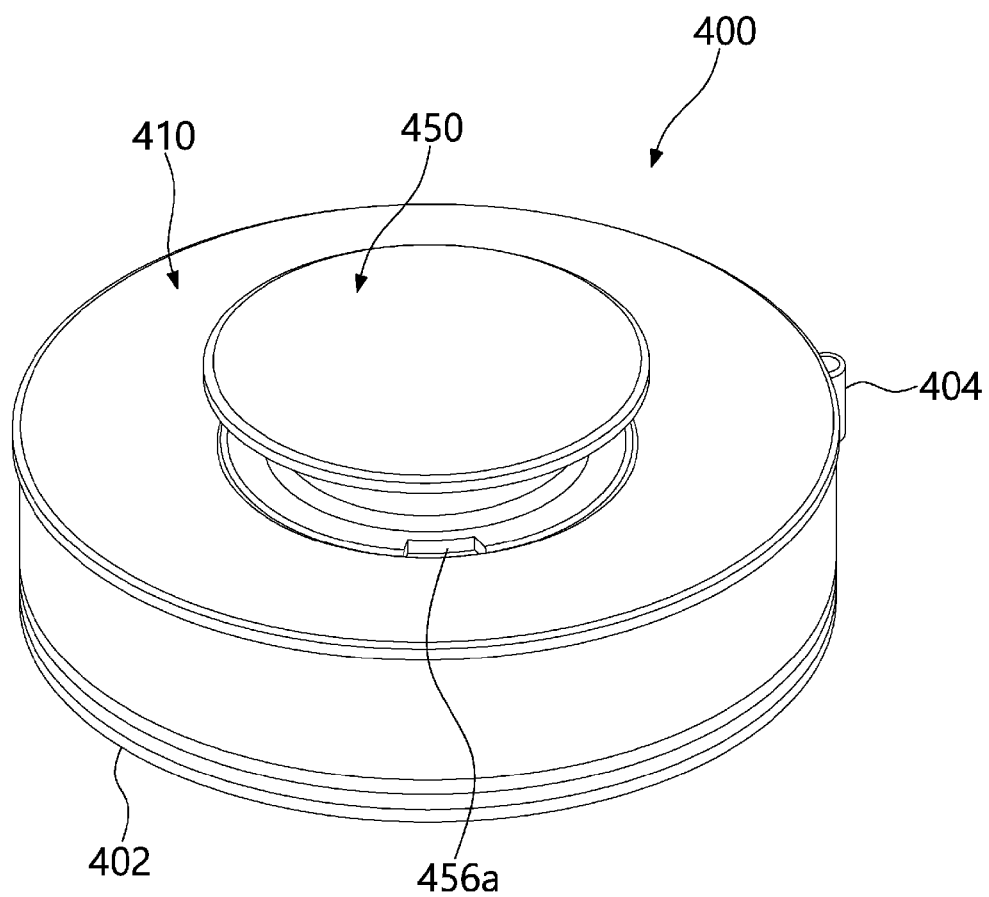
FIG. 8 is a perspective view illustrating an example of a container lid that constitutes the blender according to an embodiment of the present disclosure.
Figure 9:
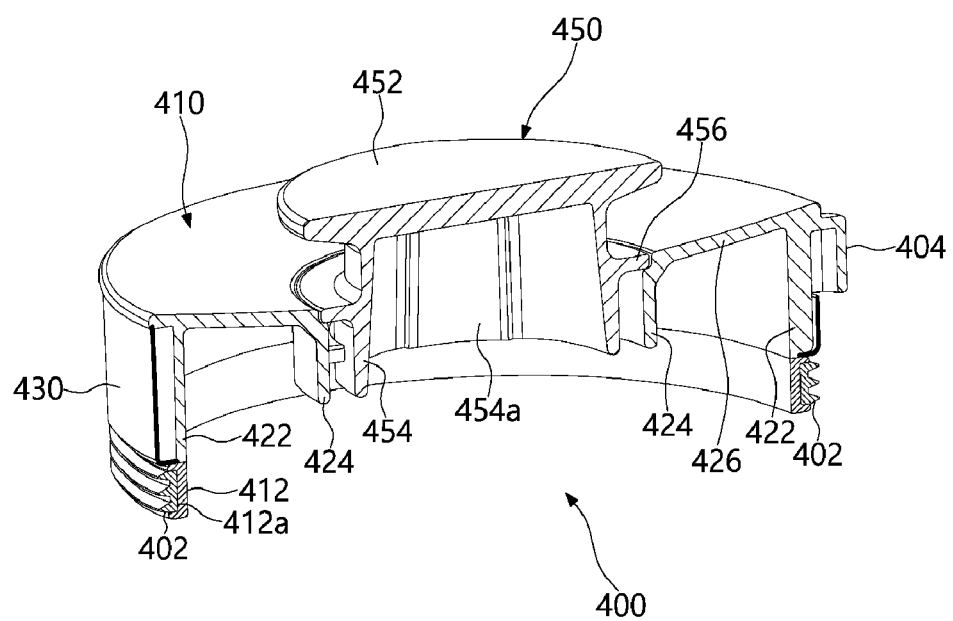
FIG. 9 is a cross-sectional perspective view illustrating an internal configuration of the container lid illustrated in FIG. 8.
Figure 10:
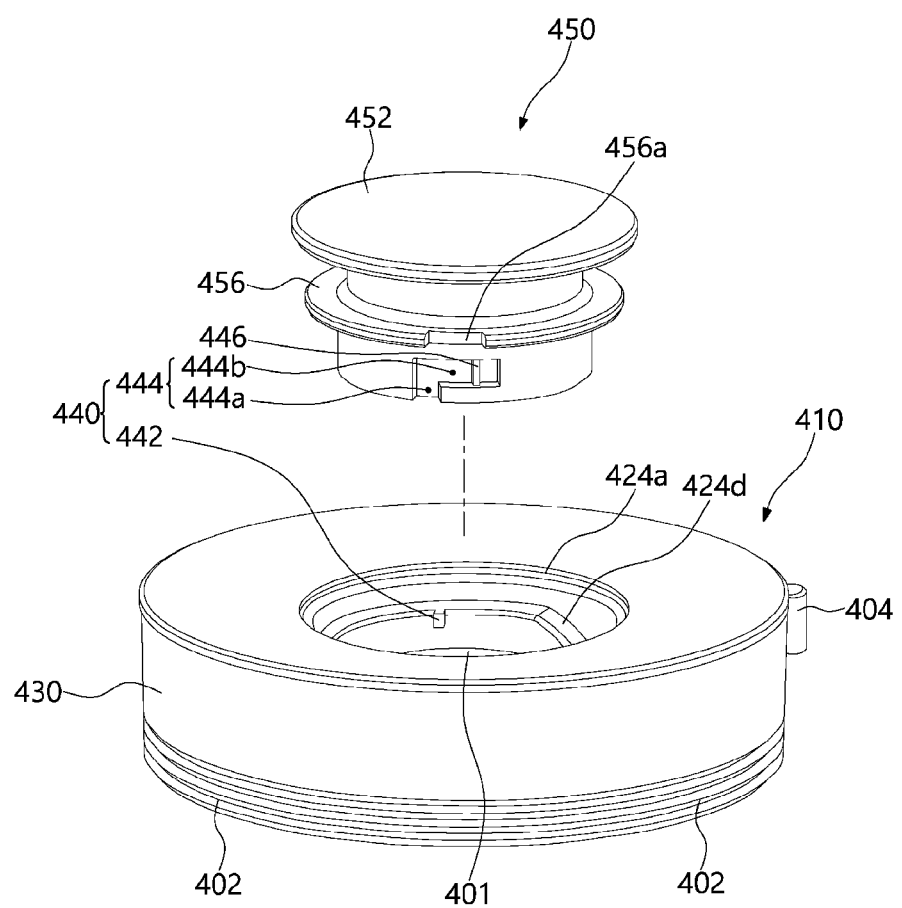
FIG. 10 is an exploded perspective view illustrating a configuration of the container lid in FIG. 8 when viewed from above.
Figure 11:
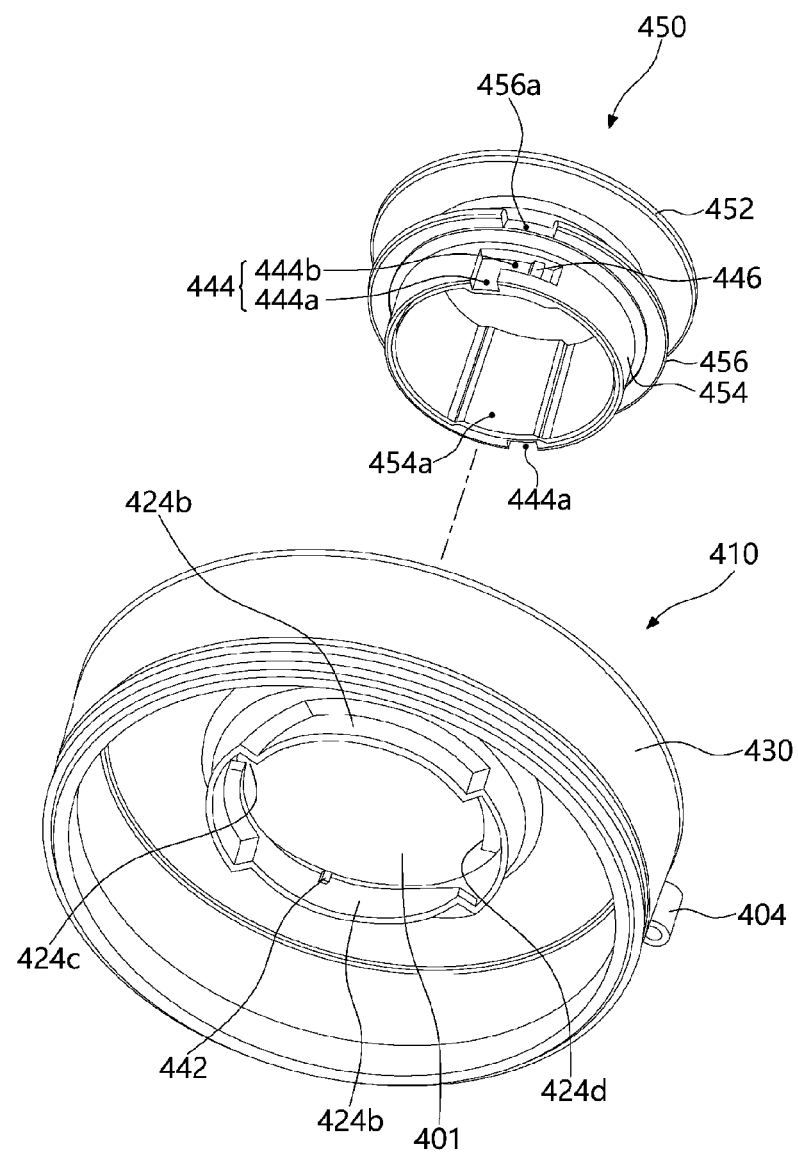
FIG. 11 is an exploded perspective view illustrating the configuration of the container lid in FIG. 8 when viewed from below.
Figure 12:
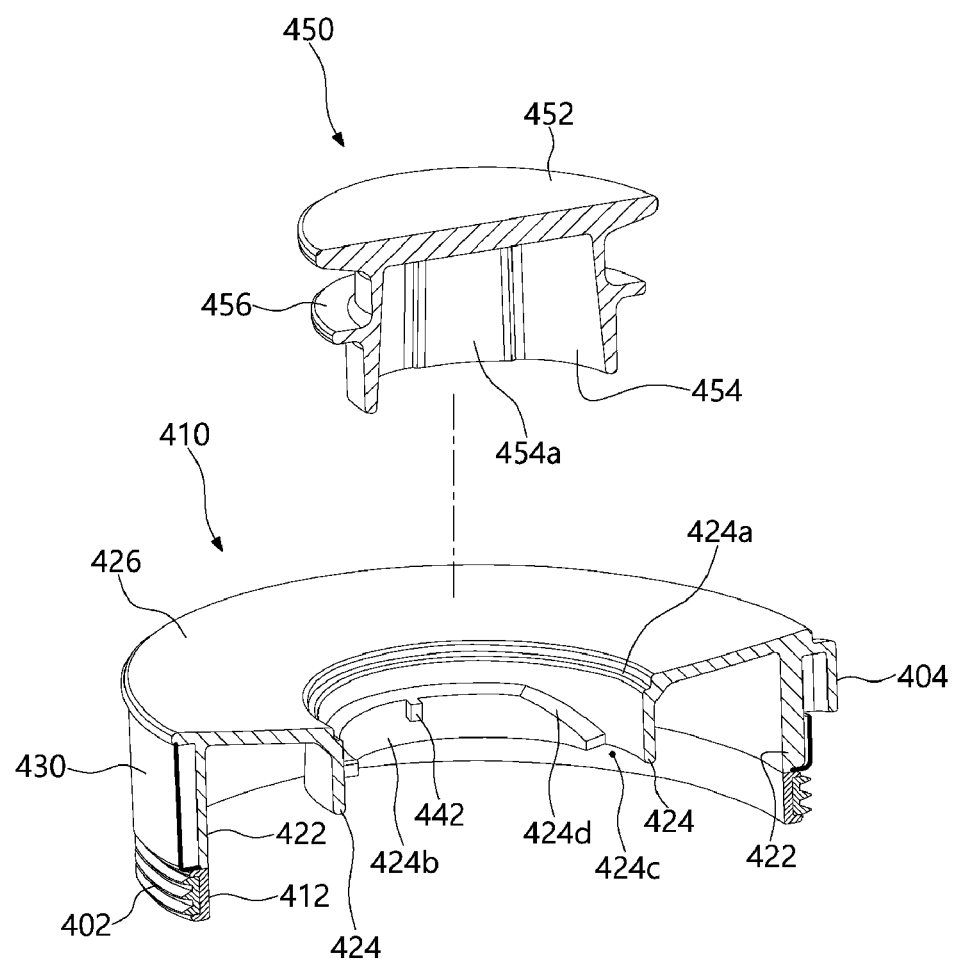
FIG. 12 is an exploded cross-sectional perspective view illustrating an internal configuration of the container lid in FIG. 8.
Figure 13:
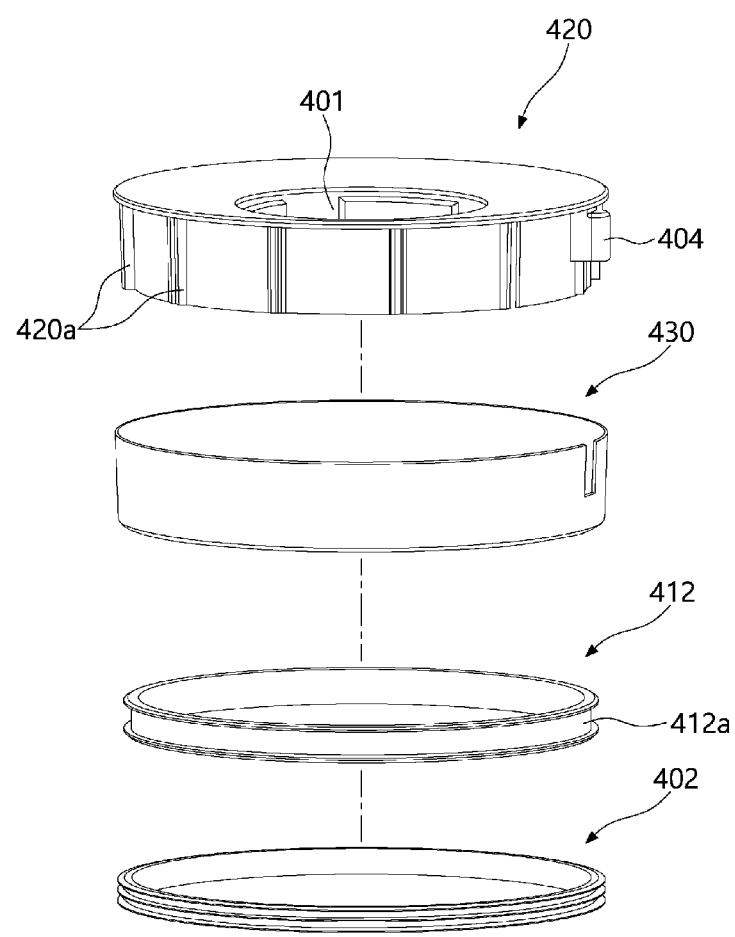
FIG. 13 is an exploded perspective view illustrating a configuration of a container-lid body that constitutes the container lid in FIG. 8.

FIGS. 8 to 13 each illustrate a detailed configuration of the container lid 400. FIG. 8 is a perspective view illustrating the container lid 400. FIG. 9 is a cross-sectional perspective view illustrating the container lid 400. FIG. 10 is an exploded perspective view illustrating the container lid 400 when viewed from above. FIG. 11 is an exploded perspective view illustrating the container lid 400 when viewed from below. FIG. 0.12 is an exploded cross-sectional perspective view illustrating the container lid 400. FIG. 13 is an exploded perspective view illustrating a container-lid body 410 of the container lid 400.

As illustrated in FIGS. 8 to 13, the container lid 400 is configured to include the container-lid body 410, the cap 450, a fastening portion 440, and the like. The cover hole 401 is formed in the container-lid body 410 in a manner that passes through the container-lid body 410 from top to bottom. The cap 450 opens and closes the cover hole 401. With the fastening portion 440, the cap 450 is detachably mounted on the container-lid body 410.

Specifically, the container-lid body 410 is formed in such a manner as to have the shape of a circular ring. The cover hole 401 is formed in a center portion of the container-lid body 410 in a manner that passes through the center portion thereof from top to bottom. The cap 450 is detachably mounted in the cover hole 401 and closes and opens the cover hole 401.

The container-lid body 410 is configured to include a cover casing 420, a cover exterior material 430, and the like. The cover hole 401 is formed in a center portion of the cover casing 420 in a manner that passes through the center portion thereof from top to bottom. The cover exterior material 430 encloses a flank surface of the cover casing 420.

A plurality of slit ribs 420a are formed in the flank surface of the cover casing 420 in a manner that protrudes outward therefrom. With the plurality of slit ribs 420, the cover exterior material 430 and the cover casing 420 are combinable with each other.

The slit ribs 420a are provided in pairs. A slit that is a gap of a predetermined size is formed between a pair of slit ribs 420a. An adhesive, such as silicone, or an elastic material is dispensed on the slit or is provided to fill the slit. It is desirable that the cover exterior material 430 and the cover casing 420 are configured in such a manner as to be combined with each other using the adhesive or the elastic material.

Of course, the slit rib 420a protrudes outward from the flank surface of the cover casing 420. Therefore, it is also possible that the cover case 420 is forced to be inserted into the cover exterior material 430 for being combined therewith.

The cover casing 420 provides an exterior appearance of the container-lid body 410 and an overall frame thereof. The cover hole 401 is formed in the center portion of the cover casing 420 in a manner that has a predetermined diameter and passes through the center portion thereof from top to bottom.

Then, the cover casing 420 is inserted into the cover exterior material 430 for being combined therewith. The exterior material 430 provides a good-quality and aesthetically pleasing exterior appearance to a user. That is, the cover casing 420 may be made of a plastic material or the like by injection molding or the like. It is desirable that the cover exterior material 430 is made of a stainless material or the like.

That is, it is desirable that the cover exterior material 430 is made of an antirust material having a smooth surface, such as a stainless steel material.

The cover exterior material 430 may be attached on an outer circumferential surface (flank surface) of the cover casing 420 using an adhesive or the like. The cover casing 420 is forced to be inserted into the cover exterior material 430 for being combined therewith. Therefore, as illustrated, it is desirable that the slit ribs 420a are formed in an equally spaced manner on the outer circumferential surface (flank surface) of the cover casing 420 in such a manner as to protrude outward from the outer circumferential surface thereof.

The cover casing 420 is configured to include an outer wall 422, an inner wall 424, an upper circular plate 426, and the like. The outer wall 422 is formed in such a manner as to have the shape of a circular ring and provides an exterior appearance of the cover casing 420. The inner wall 424 is formed in such a manner as to have a smaller diameter than the outer wall 422 and to have the cover hole 401 in the center thereof. The upper circular plate 426 connects respective upper ends of the outer wall 422 and the inner wall 424 to each other.

Specifically, the cover casing 420 is formed to a shape of a circular ring of a predetermined width that is closed at the top, when viewed as a whole. That is, the cover casing 420 is formed in the cover hole 401 in a manner that passes through the center portion thereof from top to bottom. The cover casing 420 is closed at the top, and thus has a circular-ring structure that has a longitudinal cross-sectional area in the shape of "∩".

The container lid 400 serves to cover the top of the container body 100. The cover hole 401 is formed in the center portion of the container lid 400 in a manner that passes through the center portion thereof from top to bottom. The cap 450 is detachably mounted in the cover hole 401. That is, as illustrated, the cover hole 401 is formed in the center portion of the container lid 400 in a manner that passes through the center portion thereof from top to bottom. The cover hole 401 is opened and closed by the cap 450.

The gasket 402 and a support ring 412 are further provided on a lateral side of the container-lid body 410. The gasket 402 bridges the gap between the container lid 400 and the container body 100. The support ring 412 fixedly supports the gasket 402.

In this manner, the support ring 412 and the gasket 402 that have the shape of a circular ring are provided on a lower portion of the container-lid body 410. The support ring 412 may be fixed to the lower portion of the container-lid body 410 using an adhesive or the like. The gasket 402 is brought into contact with an external surface of the support ring 412 for being fixed thereto.

More specifically, the support ring 412 is fixedly combined with a lower portion of the outer wall 422, and the gasket 402 is brought into contact with the external surface of the support ring 412 for being mounted thereon.

A support groove 412a is formed in the external surface of the support ring 412 in a manner that is cut inward. The gasket 402 is accommodated in the support groove 412a for being fastened thereto.

The gasket 402 serves to bridge the gap between the container lid 400 and the container body 100 and, at the same time, serves to prevent the container lid 400 attached to the container body 100 from being of itself separated from the container body 100.

Therefore, the gasket 402 may be made of an elastic material. As illustrated, a plurality of concave-convex portions may be formed on an outer circumferential surface of the gasket 402.

The cap 450 is configured to include an upper surface plate 452, a cap body 454, and the like. The upper surface plate 452 is exposed to the outside at the upper surface of the container-lid body 410. At least one portion of the cap body 454 is accommodated in the cover hole 401.

The cap body 454, as illustrated, is formed to a shape of a truncated cone or a cylinder that has an empty space inside when viewed as a whole. That is, it is desirable that the cap body 454 is formed to a shape of a truncated cone that is tapered to the top, or to a shape of a cylinder that has the same diameter at the top and bottom.

The upper surface plate 452 opens and closes the tip of the cap body 454. As illustrated, the upper surface plate 452 is formed in such a manner as to have a greater diameter than an end portion of the cap body 454.

An intermediate ring 456 is further formed on the cap body 454 in such a manner as to protrude outward therefrom. The intermediate ring 456 is brought into contact with an internal surface of an upper end portion of the cover hole 401.

Specifically, the intermediate ring 456 may be formed in such a manner as to protrude outward from a center portion or an upper portion of the cap body 454. When the cap 450 is mounted on the container-lid body 410, the intermediate ring 456 lies in the same plane with the upper circular plate 426. Therefore, an upper surface of the intermediate ring 456 is exposed to the outside at the top of the container-lid body 410.

A ventilation groove 456a is further formed in an outer circumferential surface of the intermediate ring 456 in a manner that is cut inward. Thus, it is possible that air flows through the intermediate ring 456 in the upward-downward direction. That is, the ventilation groove 456a serves to allow air to flow through the intermediate ring 456 on the cap 450 in the upward-downward direction. As illustrated, the ventilation groove 456a is formed in a manner that is cut inward from the outer circumferential surface of the intermediate ring 456.

A seating groove 424a is formed on an upper end portion of the inner wall 424. An edge of the intermediate ring 456 is seated in the seating groove 424a. That is, as illustrated, the seating groove 424a is formed in an upper end portion of an internal surface of the inner wall 424 in such a manner as to be stepped. The seating groove 424a is formed in a manner that is cut outward.

It is desirable that an inner circumferential surface of the seating groove 424a is formed in such a manner as to correspond to an outer circumferential surface of the intermediate ring 456 or to have a larger size than the outer circumferential surface thereof. An internal diameter of the upper end portion of the inner wall 424 is smaller than an external diameter of the intermediate ring 456. Therefore, the intermediate ring 456 is seated in the seating groove 424a, and thus is supported on the seating groove 424a without falling below the inner wall 424.

As illustrated, the outer wall 422 may be formed in such a manner as to have a height corresponding to a height of the inner wall 424 or may be formed in such a manner as to have a greater or smaller height than the inner wall 424.

The fastening unit 440 is configured to include a fastening protrusion 442, a fastening passage 444, and the like. The fastening protrusion 442 is formed on the container-lid body 410 in a manner that protrudes therefrom in one direction. The fastening passage 444 is formed in the cap 450. The fastening protrusion 442 is accommodated in the fastening passage 444. That is, the fastening unit 440 is configured to include the fastening protrusion 442 that protrudes inward from an inner circumferential surface of the container-lid body 410, the fastening passage 444 that is formed in a manner that is cut inward from an outer circumferential surface of the cap 450, and the like. The fastening protrusion 442 is moved or accommodated in the fastening passage 444.

Respective structures of and respective formation positions of the fastening protrusion 442 and the fastening passage 444 will be described in more detail below.

The fastening protrusion 442 is formed on the inner wall 424 in a manner that protrudes inward therefrom. That is, it is desirable that the fastening protrusion 442 is formed in such a manner as to be arranged a predetermined distance upward from a lower end portion of the inner wall 424.

More specifically, a close-contact plate 424b is further formed on the internal surface of the inner wall 424 in a manner that protrudes inward from the internal surface thereof. The close-contact plate 424b is brought into contact with an external surface of the cap body 454. That is, a lower end portion of the cap body 454 is formed in a manner that protrudes partly more inward, and thus the close-contact plate 424b is formed. A plurality of close-contact plates 424b may be formed on the cap body 454. According to the present disclosure, a case is illustrated where two close-contact plates 424b is formed on the cap body 454 symmetrically in the forward-backward direction or in the leftward-rightward direction.

The fastening protrusion 442 is formed on the close-contact plate 424b in a manner that protrudes inward therefrom. That is, as illustrated, the fastening protrusion 442 is formed on the close-contact plate 424b in a manner that protrudes inward (toward the center of the container lid 400) therefrom. The fastening protrusion 442 is formed in such a manner as to be positioned a predetermined distance upward from a lower end portion of the close-contact plate 424b.

It is desirable that a distance that the fastening protrusion 442 is arranged upward from the lower end portion of the cap body 454 or the close-contact plate 424b corresponds to a length in the upward-downward direction of an access groove 444a in the cap 450 described below.

Of course, it is also possible that the fastening protrusion 442 is formed, for example, on the internal surface of the inner wall 424 instead of on the close-contact plate 424b. Since the close-contact plate 424b further protrudes inward from the inner wall 424, the protruding fastening protrusion 442 has a greater thickness when formed on the internal surface of the inner wall 424 other than the close-contact plate 424b than when formed on the close-contact plate 424b.

The fastening protrusions 442 are formed at positions, respectively, that correspond to positions of the fastening passages 444. Therefore, one or more the fastening protrusions 442 may be formed on the inner wall 424 or the close-contact plate 424b. According to an embodiment of the present disclosure, a case is illustrated where two fastening protrusions 442 are formed on the inner wall 424 or the close-contact plate 424b in such a manner as to face each other at symmetrical positions.

A return groove 424c is further provided in the close-contact plate 424b. The return groove 424c is formed in a manner that is cut more outward than the close-contact plate 424b and serves as a path along which food on the close-contact plate 424b falls under. That is, two close-contact plates 424b are formed separately at symmetrical positions, respectively, on a lower portion of the inner wall 424. The return groove 424c is formed between these two close-contact plates 424b.

The return groove 424c is formed in a manner that is cut more outward than the close-contact plate 424b. Thus, the return groove 424c is open at the top and bottom. Therefore, in a state where the cap 450 is fastened to the container-lid body 410, in a case where the food in the container body 100 spills onto the close-contact plate 424b, the food falls under through the return groove 424c back into the container body 100.

A return guide 424d is further provided on one end portion of the close-contact plate 424b. The return guide 424d is formed in such a manner that, the more the return guide 424d protrudes in one direction, the more decreased a height of an upper end thereof. The return guide 424d serves to guide moving of the food on the close-contact plate 424b toward the return groove 424c.

Specifically, the return guide 424d is formed on opposite end portions of the close-contact plate 424b or any one of the right or left end portions thereof in such a manner that, the more the return guide 424d protrudes leftward or rightward, the more the return guide 424d is inclined downward and the more decreased the height of the upper end thereof. Therefore, the food positioned on the close-contact plate 424b slides into the return groove 424c along the return guide 424d. Then, the food falls into the container body 100 below through the return groove 424c.

The fastening passage 444 is formed in the outer circumferential surface of the cap 450. The fastening passage 444 not only provides a path along which the fastening protrusion 442 moves, but also keeps the fastening protrusion 442 accommodated. Thus, the cap 450 is combined with the container-lid body 410.

The fastening passage 444 is configured to include the access groove 444a, a fastening groove 444b, and the like. The access groove 444a is formed in a manner that is cut inward from the outer circumferential surface of the cap 450. The access groove 444a guides moving of the fastening protrusion 442 in the upward-downward direction. The fastening groove 444b is formed in such a manner as to horizontally extend from one end portion of the access groove 444a. The fastening grooves 444b provide a space in which the fastening protrusion 442 is accommodated.

Specifically, when a pair of fastening passages 444 is formed in an outer circumferential surface of the lower end portion of the cap body 454, it is desirable that the same number of the fastening passages 444 is formed as the fastening protrusions 442.

As illustrated, the access groove 444a is formed in such a manner as to extend upward from the lower end portion of the cap body 454. The access groove 444a is formed in such a manner as to extend a predetermined distance upward from an internal surface of the lower end portion of the cap body 454. That is, it is desirable that a length in the upward-downward direction of the access groove 444a corresponds to a distance from a lower end of the internal wall 424 to the fastening protrusion 442.

The fastening groove 444b is formed in such a manner as to vertically extend leftward or leftward from an upper end portion of the access groove 444a. That is, the access groove 444a is formed in such a manner as to vertically extend in the upward-downward direction, and the fastening groove 444b is formed in such a manner as to horizontally extend in the leftward-rightward direction. Therefore, an upper end portion of the access groove 444a and a left end portion or a right end portion of the fastening groove 444b are connected to each other, and thus the fastening protrusion 442 is able to move in a state of being accommodated in the access groove 444a and the fastening groove 444b.

A prevention protrusion 446 is formed on the fastening groove 444b in a manner that protrudes outward therefrom. The prevention protrusion 446 prevents separation of the fastening protrusion 442 accommodated in the fastening groove 444b. That is, as illustrated, the prevention protrusion 446 of a predetermined size is formed on the fastening groove 444b in a manner that protrudes outward therefrom.

It is desirable that the prevention protrusion 446 is formed in a manner that intersects the fastening groove 444b in the upward-downward direction. It is desirable that the prevention protrusion 446 is formed in such a manner that a length of the protruding prevention protrusion 446 is smaller than a depth of the fastening groove 444b.

It is desirable that the prevention protrusion 446 is formed adjacent to the end portion of the fastening groove 444b. FIG. 11 illustrates a case where the prevention protrusion 446 is formed adjacent to the right end portion of the fastening groove 444b.

One portion of an inner circumferential surface of the cap body 454 may further protrude inward. Thus, a reinforcement portion 454a may be formed. That is, in a case where an opposite side (internal surface) of the cap body 454, in which the fastening passage 444 is formed, further protrudes inward and where the fastening passage 444 is formed in an outer circumferential surface of the cap body 454, it is also desirable that the cap body 454 maintains a predetermined thickness.

Figure 14:
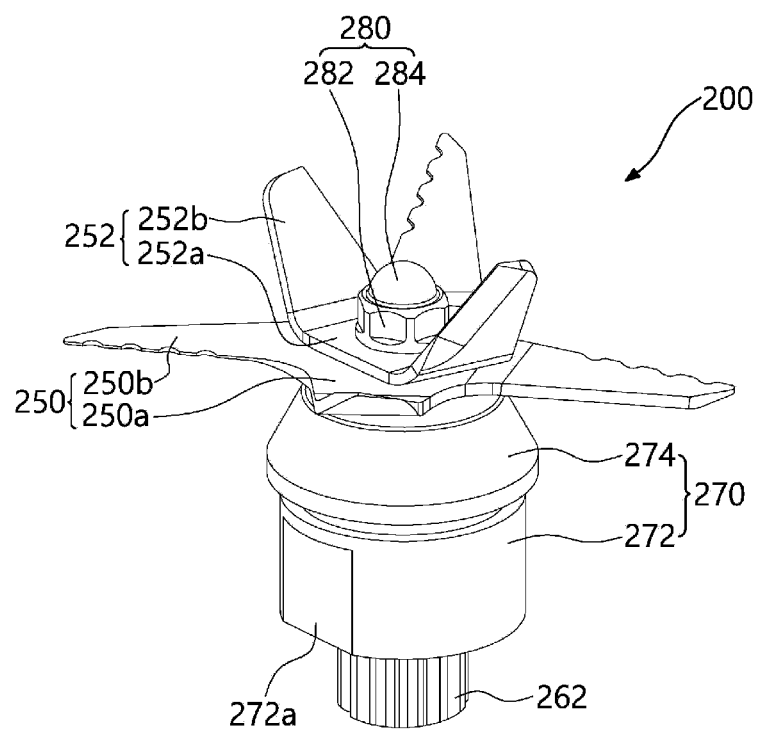
FIG. 14 is a perspective view illustrating a configuration of a blade assembly that constitutes the blender according to an embodiment of the present disclosure.
Figure 15:
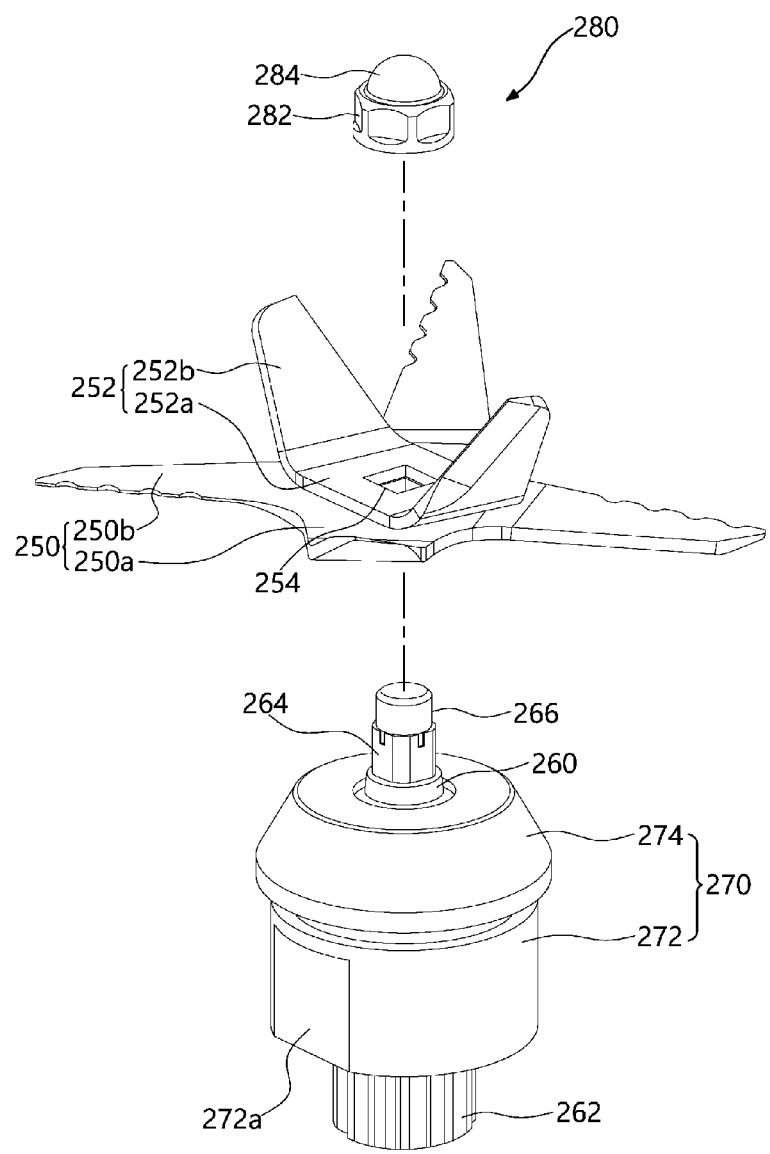
FIG. 15 is an exploded perspective view illustrating a detailed configuration of the blade assembly that constitutes the blender according to the embodiment of the present disclosure.

FIGS. 14 and 15 each illustrate a configuration of the blade assembly 200. That is, FIG. 14 is a perspective view illustrating the blade assembly 200, and FIG. 15 is an exploded perspective view illustrating the blade assembly 200.

As illustrated in FIGS. 14 and 15, the blade assembly 200 is configured to include a main blade 250, an auxiliary blade 252, a blade shaft 260, a body 270, a fixation cap 280, and the like. The main blade 250 includes a plurality of main blade portions 250b. The auxiliary blade 252 includes auxiliary blade portions 252b, each being positioned between each of the plurality of main blade portions 250b. The main blade 250 and the auxiliary blade 252 rotate about the blade shaft 260. The body 270 is mounted on the lower end portion of the container body 100 and rotatably supports the blade shaft 260. The fixation cap 280 is fastened to the blade shaft 260 and serves to fix the main blade 250 and the auxiliary blade 252 to the blade shaft 260.

The blade assembly 200 serves to chop food into small pieces or to mix the food using the blades. These blades that chop the food into small pieces include the main blade 250, the auxiliary blade 252, and the like.

The main blade 250 primarily serves to chop the food into small pieces. The auxiliary blade 252 serves to assist the main blade 250 in easily chopping the food into smaller pieces and mixing the food.

The main blade 250 is configured to include a main fixation portion 250a, the plurality of blade portions 250b, and the like. The main fixation portion 250a is combined with the blade shaft 260. The plurality of blade portions 250b are formed in a manner that protrudes outward from the main fixation portion 250a.

As illustrated, the main fixation portion 250a is formed in such a manner as to constitute a center portion of the main blade 250. The main fixation portion 250a is combined with the blade shaft 260 and supports the plurality of main blade portions 250b that are formed integrally into one piece in a manner that protrudes outward from the main fixation portion 250a.

Four main blade portions 250b are formed in a manner that protrudes radially from the main fixation portion 250a. The four main blade portions 250b are symmetrically formed in such a manner as to be equiangular with respect to the center of the main fixation portion 250a.

Specifically, as illustrated, the main fixation portion 250a of a predetermined size having the shape of a flat plate is formed on a center portion of the main blade 250. The four main blade portions 250b are formed integrally into one piece in a manner that protrudes outward from the main fixation portion 250a.

It is desirable that an even number of main blade portions 250b are provided. It is desirable that the main blade portions 250b are formed in such a manner as to be symmetrical about the blade shaft 260 in the forward-backward direction or the leftward-rightward direction.

According to the present disclosure, a case is illustrated where four main blade portions 250b are provided. Of course, it is also possible that three or five main blade portions 250b are formed in such a manner as to be equiangular with respect to the center of the main fixation portion 250a. That is, it is also possible that an even number of main blade portions 250b are provided.

The main blade portion 250b is formed in such a manner as to be in parallel with the main fixation portion 250a or in such a manner as to make a predetermined angle with the main fixation portion 250a.

Specifically, the main blade portion 250b is formed in a manner that extends horizontally outward from an end of the main fixation portion 250a or in a manner that extends upward or downward at a predetermined inclined angle from the end of the main fixation portion 250a.

According to the present disclosure, as illustrated in FIGS. 14 and 15, among the total four main blade portions 250b, two main blade portions 250b in the leftward-rightward direction are formed in such a manner as to be horizontal with the main fixation portion 250a, and two main blade portions 250b in the forward-backward direction extend upward at a predetermined inclined angle from front and rear ends, respectively, of the main fixation portion 250a.

Figure 17:
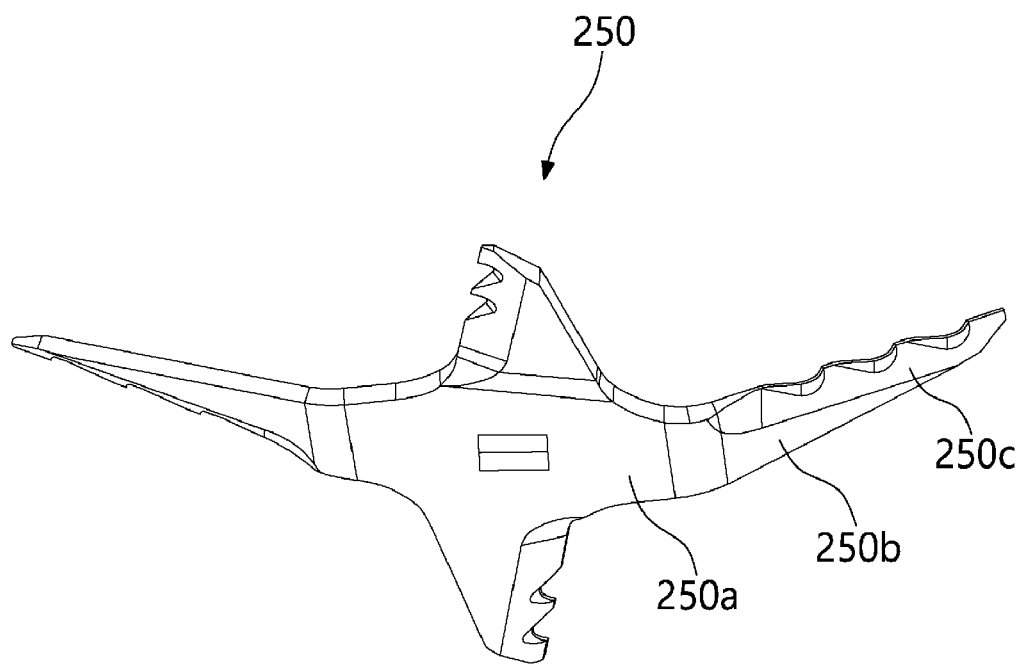
FIG. 17 is a perspective view illustrating the configuration of the implementation example of the main blade that constitutes the blender according to the embodiment of the present disclosure, when viewed from below.

In addition to this configuration, the main blade portion 250b may extend downward at a predetermined inclined angle from the main fixation portion 250a (refer to FIG. 17).

In addition, in FIGS. 14 and 15, the main blade portions 250b are configured in such a manner as to be symmetrical in the forward-backward direction or the leftward-rightward direction about the main fixation portion 250a. However, it is also possible that the main blade portions 250b are configured in such a manner as not to be symmetrical in the forward-backward direction or the leftward-rightward direction about the main fixation portion 250a.

For example, it is possible that two main blade portions 250b are formed on the left and right sides, respectively, of the main fixation portion 250a in such a manner as to extend horizontally or to extend upward or downward at a predetermined inclined angle. In addition, it is also possible that two main blade portions 250b are formed on the left and right sides, respectively, of the main fixation portion 250a in such a manner as to extend in opposite directions at a predetermined inclined angle. That is, it is possible that one main blade portion 250b of a pair of main blade portions 250b is formed on the left side of the main fixation portion 250a in such a manner as to extend downward at a predetermined inclined angle and that the other main blade portion 250b is formed on the right side of the main fixation portion 250a in such a manner as to extend upward at a predetermined inclined angle (refer to FIG. 17).

The auxiliary blade 252 is configured to include an auxiliary fixation portion 252a, a plurality of auxiliary blade portions 252b, and the like. The auxiliary fixation portion 252a is combined with the blade shaft 260, and the plurality of auxiliary blade portions 252b is formed in such a manner as to protrude outside from the auxiliary fixation portion 252a.

As illustrated, the auxiliary fixation portion 252a constitutes a center portion of the auxiliary blade 252 and is combined with the blade shaft 260. The auxiliary fixation portion 252a supports one or more auxiliary blade portions 252b that are formed integrally into one piece in a manner that protrudes outward from the auxiliary fixation portion 252a.

It is desirable that a smaller number of the auxiliary blade portions 252b are provided than the main blade portions 250b. It is desirable that the auxiliary blade portions 252b have a smaller length than the main blade portion 250b.

Of course, it is also possible that the number of the provided auxiliary blade portions 252b is the same as the number of the provided main blade portions 250b or that the auxiliary blade portion 252b has the same size as the main blade portion 250b. According to the present disclosure, the auxiliary blade portion 252b is formed in such a manner as to be smaller in number than the main blade portion 250b or in such a manner as to have a smaller size than the main blade portion 250b. For this reason, the auxiliary blade portion 252b will be described taking as an example a function of assisting the main blade portion 250b in chopping the food into smaller spaces.

It is also desirable that an even number of the auxiliary blade portions 252b are provided. That is, as illustrated, it is desirable that two auxiliary blade portions 252b are provided in such a manner as to extend upward at a predetermined inclined angle from both ends, respectively, of the auxiliary fixation portion 252a. As is the case with the main blade portion 250b, four auxiliary blade portions 252b may be provided depending on the situation.

According to the present disclosure, as illustrated, a case is illustrated where two auxiliary blade portions 252b are formed in such a manner as to protrude symmetrically outward from the auxiliary fixation portion 252a.

The auxiliary blade portion 252b is formed in such a manner as to extend upward at a predetermined inclined angle from an end of the auxiliary fixation portion 252a. Thus, the auxiliary blade portion 252b makes the predetermined angle with the auxiliary fixation portion 252a.

Then, it is desirable that an angle that the auxiliary blade portion 252b and the auxiliary fixation portion 252a make with each other is smaller than an angle that the main blade portion 250b and the main fixation portion 250a make with each other.

Specifically, the auxiliary blade portion 252b extends upward at a greater inclined angle than the main blade portion 250b. That is, it is desirable that an angle that the auxiliary blade portion 252b and an upper surface of the auxiliary fixation portion 252a make with each other is smaller than the angle that the main blade portion 250b and the main fixation portion 250a make with each other.

Accordingly, the auxiliary blade 252 serves to assist the main blade 250 in chopping the food into smaller pieces and at the same time control moving of the food inside a center portion of the container body 100. That is, the auxiliary blade portion 252b of the auxiliary blade 252 is positioned in the center portion of the container body 100, and thus this positioning is also effective in mixing the food inside the container body 100 by rotation.

Specifically, the auxiliary blade portion 252b partially chops the food lying on a center portion other than a space in which the main blade portion 250b operates. At the same time, the auxiliary blade portion 252b also serves to push the food lying on the center portion upward or outward or to rotate the food lying thereon, thereby moving the food toward the main blade portion 250b, upward, or in other directions.

In this manner, the main blade 250 primarily serves to move the food accommodated in the container body 100 and at the same time to chop the food into small pieces, and the auxiliary blade 252 serves to assist the main blade 250 in chopping the food on the center portion of the container body 100 into smaller pieces and at the same time to move the food thereon.

The auxiliary blade portion 252b is mounted in such a manner as to be positioned between each of the plurality of main blade portions 250b. That is, the plurality of main blade portions 250b is mounted in such a manner that an angle that the main blade portion makes with respect to the center of the main fixation portion 250a is 90° and in such a manner as to be equally spaced. The auxiliary blade portion 252b is positioned between each of the main blade portions 250b.

Accordingly, when the main blade portion 250b cannot touch the food, the auxiliary blade portion 252b may touch the food. Thus, the efficiency of chopping the food into small pieces and mixing the food can be increased.

A fastening hole 254 is formed in respective center portions of the main blade 250 and the auxiliary blade 252 in a manner that passes through the respective center portions thereof from top to bottom. A fastening plate 264 described below is accommodated in the fastening hole 254. That is, the fastening hole 254 is formed in each of the center portions of the main fixation portion 250a of the main blade 250 and the center portion of the auxiliary fixation portion 252a of the auxiliary blade 252 in a manner that passes through from top to bottom.

The fastening hole 254 is formed in such a manner as to have a shape corresponding to a shape of an external surface of the fastening plate 264 described below. Thus, with this configuration, rotation of the blade shaft 260 rotates the main blade 250 and the auxiliary blade 252.

Therefore, as illustrated, it is desirable that the fastening hole 254 is formed in such a manner as to have a four-square cross-section.

The body 270 is configured to include a seating portion 272, a protrusion portion 274, and the like. The seating portion 272 is fixedly mounted on the bottom surface of the container body 100. The protrusion portion 274 is formed on an upper surface of the seating portion 272 and is exposed in a manner that protrudes upward from the bottom surface of the container body 100.

As illustrated, the seating portion 272 is formed in such a manner as to have the shape of a cylinder when viewed as a whole, and thus is mounted on the bottom surface of the container body 100. Therefore, it is desirable that a key pocket 272a is further formed in at least one surface of the seating portion 272. A portion of the bottom surface of the container body 100 is inserted into the key pocket 272a from bottom to top, and thus the body 270 is prevented from being rotated. That is, the key pocket 272a is further formed in the seating portion 272, and a portion of the bottom surface of the container body 100 is inserted into the key pocket 272a, thereby holding the body 270 in place.

Specifically, the body 270 needs to be stationary without being rotated in a state of being mounted in the container body 100 when the blade shaft 260 is rotated. For this reason, the key pocket 272a into which a portion of the bottom surface of the container body 100 is to be inserted is formed.

The key pocket 272a is cut inward from an external surface of the seating portion 272 in such a manner as to have a flat bottom. The key pocket 272a is brought into contact with a corresponding surface (not illustrated) of the container body 100, thereby preventing the rotation of the body 270.

As illustrated, the key pocket 272a is formed to a shape of a flat groove that is open at the bottom. It is desirable that key pockets 272a are formed in a pair in such a manner as to be symmetrical in the leftward-rightward direction. Therefore, the body 270 is held in place in a state where a portion of the bottom surface of the container body 100 is inserted into the key pocket 272a from bottom to top.

As illustrated, a protrusion portion 274 is formed on the upper surface of the seating portion 272. Then, the protrusion portion 274 is formed in such a manner that a lower end portion thereof has a greater external diameter than the seating portion 272.

Therefore, when the body 270 is mounted on the bottom surface of the container body 100, the external diameter of the lower end portion of the protrusion portion 274 is greater than an internal diameter of a body insertion hole (not illustrated) that is formed on the bottom surface of the container body 100 in a manner that passes through the bottom surface thereof from top to bottom. The protrusion portion 274 is exposed in a manner that protrudes upward from a bottom surface of in the inner container body 100.

As illustrated, it is desirable that the protrusion portion 274 is tapered to the top, and thus an external diameter thereof gradually decreases in the upward direction.

The blade shaft 260 is formed in such a manner as to have a predetermined length in the upward-downward direction and is mounted in such a manner as to pass through an internal center portion of the body 270.

Then, the blade shaft 260 is rotatably mounted inside the body 270. Therefore, although not illustrated, it is desirable that a bearing is mounted inside the body 270. The bearing allows the blade shaft 260 to be rotated in a state of being inserted.

A connection portion 262 is provided on a lower end portion of the blade shaft 260. The connection portion 262 moves in conjunction with the motor assembly 600 and thus serves to transfer the rotational force generated by the motor assembly 600.

As illustrated, it is desirable that the connection portion 262 is configured as a spline shaft having a cross section having a concave-convex external shape. Therefore, although not illustrated, it is desirable that a corresponding spline boss is provided on an upper-end connection portion of the motor assembly 600 that is combined with the connection portion 262.

The fastening plate 264 and a fastening shank 266 are provided on an upper end of the blade shaft 260. The main blade 250 and the auxiliary blade 252 are mounted on the fastening plate 264. The fixation cap 280 is fastened to the fastening shank 266.

Specifically, the fastening shank 266 with which the fixation cap 280 is to be combined is formed on the upper end of the blade shaft 260. The fastening plate 264 is provided underneath the fastening shank 266.

As illustrated, it is desirable that the fastening plate 264 is formed in such a manner as to have a smaller external diameter than the blade shaft 260 accommodated in body 270.

Therefore, the main blade 250 and the auxiliary blade 252 no longer moves down in a state of being mounted on the fastening plate 264. Thus, the main blade 250 and the auxiliary blade may be rotated without respective bottom surfaces thereof interfering with an upper surface of the body 270.

The main blade 250 and the auxiliary blade 252, along with the blade shaft 260, are rotated in a state of being mounted on the fastening plate 264.

Therefore, it is desirable that an external surface of the fastening plate 264 has a shape corresponding to an internal diameter of the fastening hole 254. That is, the fastening hole 254 formed in the main blade 250 and the auxiliary blade 252 has a four-square cross section. Thus, when the external surface of the fastening plate 264 has a size and a shape corresponding to a size and a shape of the fastening hole 254, the main blade 250 and the auxiliary blade 252, along with the blade shaft 260, are rotatable in a state of being mounted on the fastening plate 264 without a separate fixation mechanism.

In this manner, it is desirable that a flat cross-section of the fastening plate 264 has a four-square shape corresponding to a shape of the fastening hole 254. The fastening plate 264 needs to have an external surface that is smaller than an internal surface of the fastening hole 254 in such a manner that the fastening plate 264 is accommodated in the fastening hole 254. The fastening plate 264 needs to be formed in such a manner that a length of a diagonal of the flat cross-section thereof is greater than a distance between surfaces facing each other in the fastening hole 254. Thus, the main blade 250 and the auxiliary blade 252 are not allowed to be rotated in a state of being fastened to the fastening plate 264.

The fixation cap 280 is fastened to the upper end of the blade shaft 260. The main blade 250 and the auxiliary blade 252 are mounted on the blade shaft 260, and thus are kept held in place without deviating upward.

The fixation cap 280 is configured to include a nut portion 282, a cap portion 284, and the like. The nut portion 282 is combined with the fastening shank 266. The cap portion 284 protrudes upward from an upper surface of the nut portion 282 in a manner that has the shape of a dome.

It is desirable that the fixation cap 280 is fastened by a bolt-nut mechanism to the fastening shank 266. The nut portion 282 is tapped, and the fastening shank 266 is threaded.

The cap portion 284 is formed to a shape of a dome that is a hemispherical roof. The cap portion 284 is formed integrally with the nut portion 282. The cap portion 284 may serve to prevent the food or foreign material from permeating into a hole underneath the cap portion 284 that is formed on the center portion of the nut portion 282 and may serve to guide sliding of the food without coming into contact with an upper surface thereof and being fixed to the upper surface.

Figure 16:
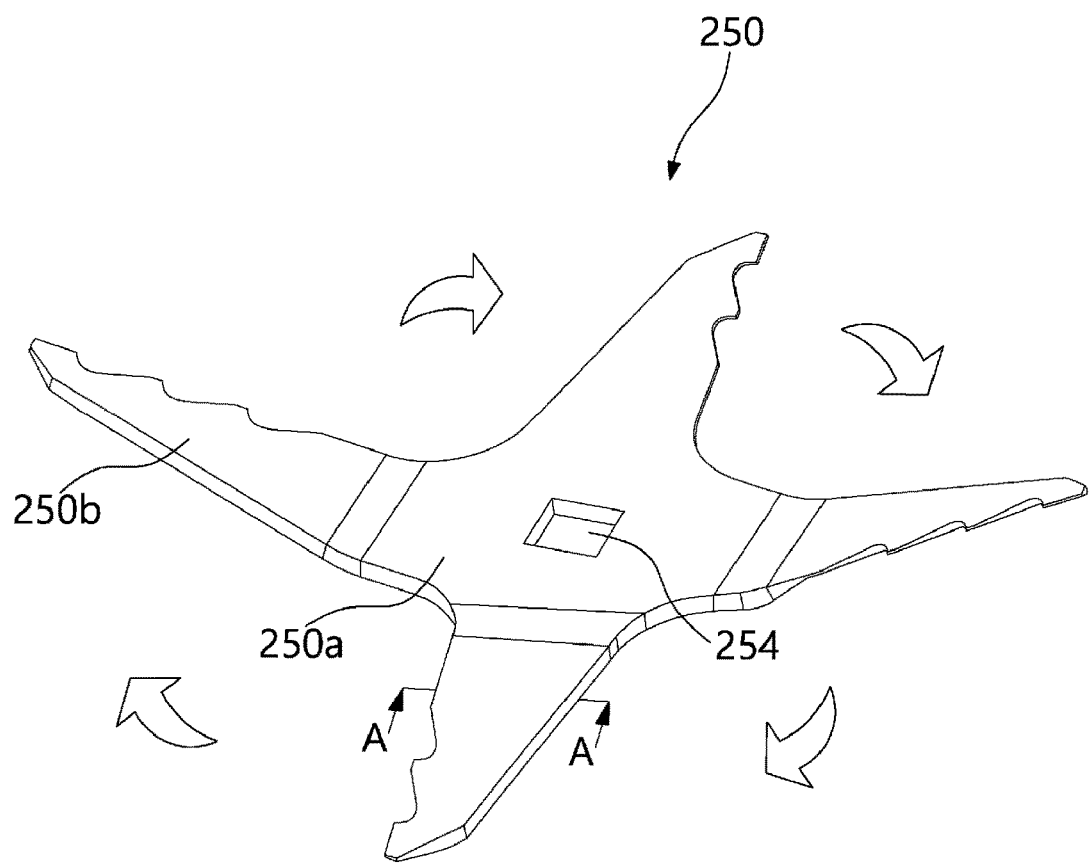
FIG. 16 is a perspective view illustrating a configuration of an implementation example of a main blade that constitutes the blender according to an embodiment of the present disclosure, when viewed from above.
Figure 18:
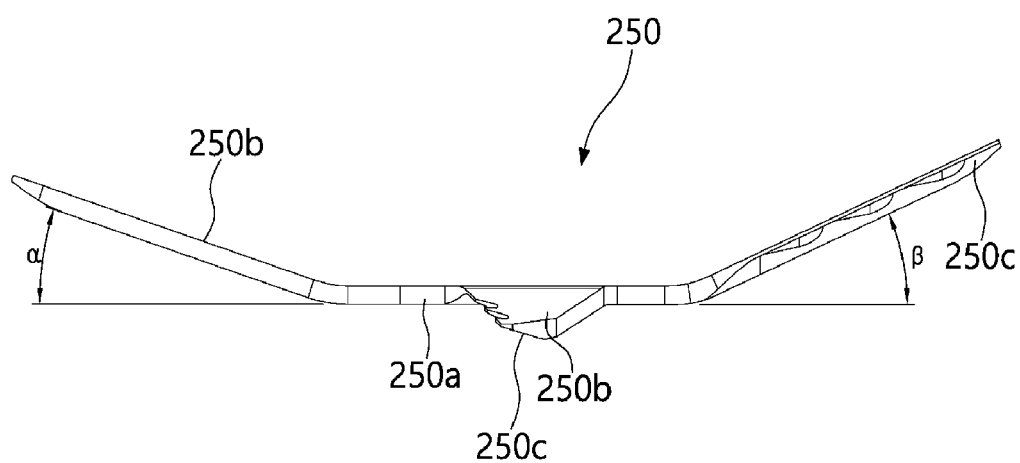
FIG. 18 is a front view illustrating the configuration of the implementation example of the main blade that constitutes the blender according to the embodiment of the present disclosure.
Figure 19:
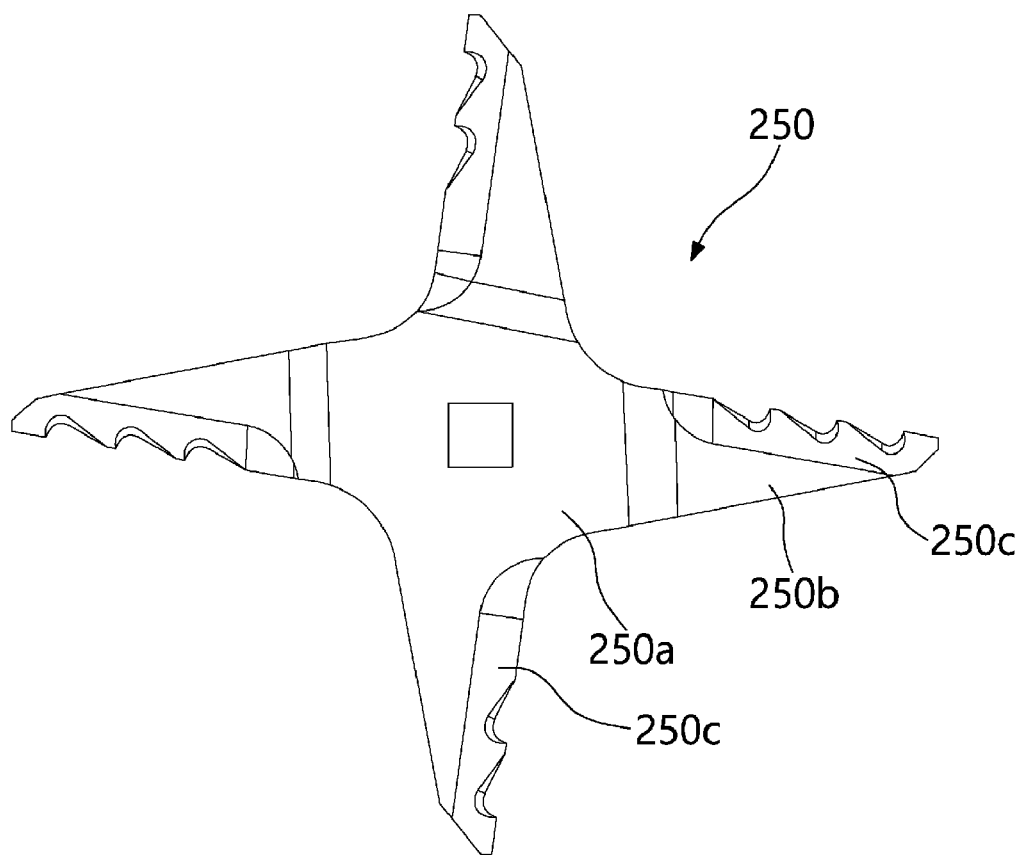
FIG. 19 is a bottom view illustrating the configuration of the implementation example of the main blade that constitutes the blender according to the embodiment of the present disclosure.
Figure 20:
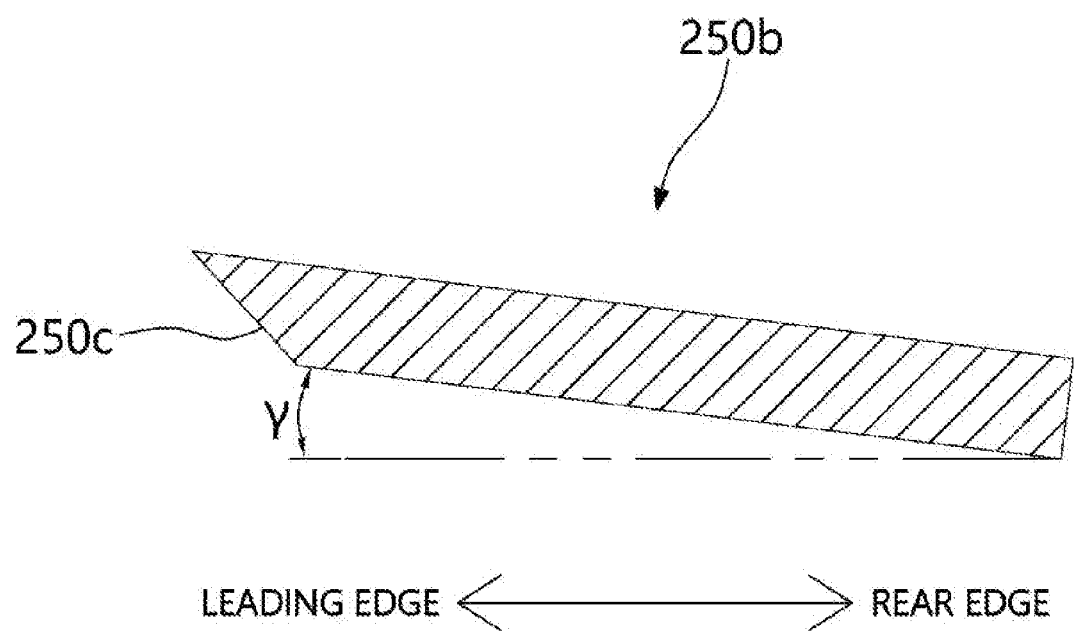
FIG. 20 is a cross-sectional view taken along line A-A on FIG. 16.
Figure 21:
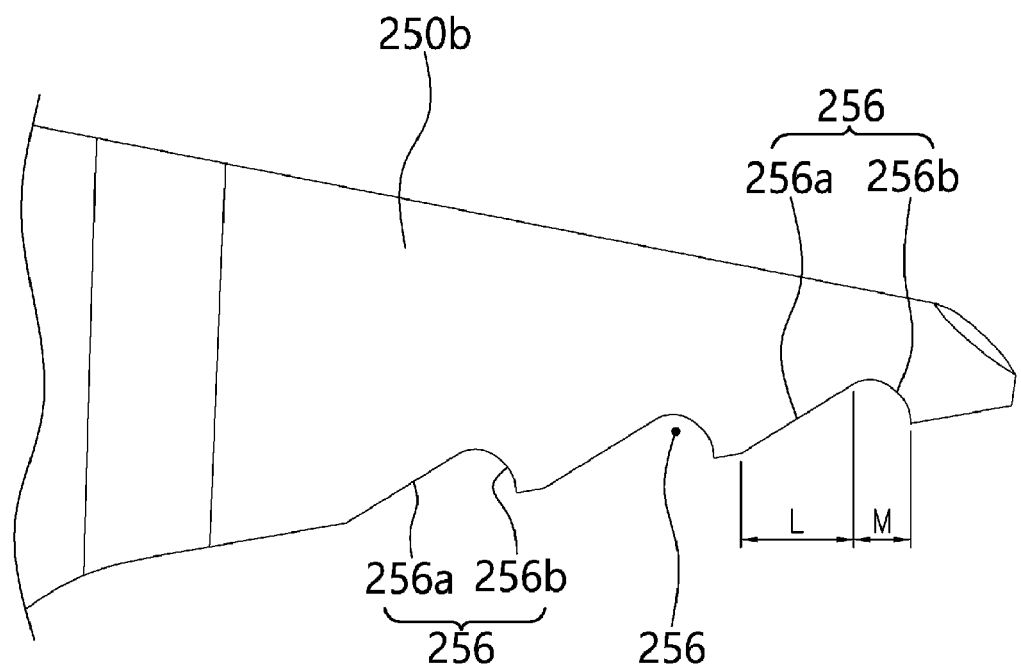
FIG. 21 is an enlarged view partially illustrating a configuration of a main blade portion of the main blade illustrated in FIG. 16.

FIGS. 16 to 20 are views each illustrating an implementation example of the blade that constitutes the blade assembly 200. FIG. 16 is a perspective view illustrating a configuration of the implementation example of the main blade 250 that constitutes the blade assembly 200, when viewed from above. FIG. 17 is a perspective view illustrating a configuration of the implementation example of the main blade 250 that constitutes the blade assembly 200, when viewed from below. FIG. 18 is a front view illustrating the blade 250. FIG. 19 is a bottom view illustrating the main blade 250. FIG. 20 is a cross-sectional view taken along line A-A on FIG. 16. FIG. 21 is a plane view illustrating the main blade portion 250b that constitutes the main blade 250.

FIGS. 16 to 21 each illustrate the implementation example of the main blade 250 of the main and auxiliary blades 250 and 252. Therefore, a description will be provided below, taking an example the configuration of the main blade 250. The auxiliary blade 252 may have the same configuration as the main blade 250.

A component of the main blade 250 that is the same as described above, when performing the same function, is given the same reference character as assigned above, and detailed descriptions of a configuration and a function thereof are omitted for convenience of description.

As described above, the main blade 250 is configured to include the main fixation portion 250a, the plurality of blade portions 250b, and the like. The main fixation portion 250a is combined with the blade shaft 260. The plurality of blade portions 250b are formed in a manner that protrudes outward from the main fixation portion 250a.

Four main blade portions 250b are formed in a manner that protrude radially from the main fixation portion 250a. The four main blade portions 250b are symmetrically formed in such a manner as to be equiangular with respect to the center of the main fixation portion 250a. That is, the four main blade portions 250b are formed integrally into one piece in a manner that protrude outward from the main fixation portion 250a.

According to the present disclosure, a case is illustrated where the four main blade portions 250b are provided. The main blade portion 250b may be formed in such a manner as to lie in the same plane with the main fixation portion 250a or to have a predetermined angle.

As a specific example, as illustrated, among the total four main blade portions 250b, two main blade portions 250b in the leftward-rightward direction are formed in such a manner as to extend upward at predetermined inclined angles α and β, respectively, with respect to the main fixation portion 250a, and two main blade portions 250b in the forward-backward direction extend downward at predetermined inclined angles from the front and rear ends, respectively, of the main fixation portion 250a.

In addition to this configuration, one or more of the main blade portions 250b may be formed in such a manner as to extend sideways in the same plane in order to be in parallel with the main fixation portion 250a.

In addition, the main blade portion 250b may be configured in such a manner as to be symmetrical in the forward-backward direction or the leftward-rightward direction about the main fixation portion 250a. However, it is also possible that the main blade portion 250b is configured in such a manner as not to be symmetrical in the forward-backward direction or the leftward-rightward direction about the main fixation portion 250a.

For example, it is possible that two main blade portions 250b are formed on the left and right sides, respectively, of the main fixation portion 250a in such a manner as to extend horizontally or to extend at a predetermined inclined angle in the upward-downward direction. In addition, it is also possible that two main blade portions 250b are formed on the left and right sides, respectively, of the main fixation portion 250a in such a manner as to extend in opposite directions at predetermined inclined angles. That is, it is also possible that one main blade portion 250b of a pair of main blade portions 250b is formed on the left side of the main fixation portion 250a in a manner as to extend downward at a predetermined inclined angle and that the other main blade portion 250b is formed on the right side of the main fixation portion 250a in a manner as to extend upward at a predetermined inclined angle.

In a case where the pair of main blade portions 250b that are formed on the left and right sides, respectively, of the main fixation portions 250a both extend upward or downward at a predetermined inclined angle, it is also possible that the pair of main blade portions 250b are formed in such a manner as to expend upward or downward at different inclined angles. That is, with reference to FIG. 18, as an example, an angle α that a main blade portion 250b' formed on the left side of the main fixation portion 250a and the main fixation portion 250a make with each other may be set to be different from an angle β that a main blade portion 250b" formed on the right side of the main fixation portion 250a and the main fixation portion 250a make with each other.

Furthermore, it is also possible that the two main blade portions 250b formed on the left side of the main fixation portion 250a and the two main blade portions 250b formed on the right side of the main fixation portion 250a are all formed in such a manner as to expand horizontally or in such a manner as to expand at four different inclined angles or in four different directions.

In this manner, when the main blade portion 250b is configured to expand at various inclined angles in this manner, this configuration is effective in expanding an area where the food is chopped into small pieces by the main blade portion 250b, and thus the efficiency of chopping the food into small pieces can be improved.

It is desirable that at least one end portion of the main blade 250 is formed in such a manner as to have a smaller thickness than a center portion thereof. That is, the main blade 250 or the auxiliary blade 252 is formed in such a manner that a thickness of the main blade 250 or the auxiliary blade 252 gradually decreases going toward an end of the main blade 250 or the auxiliary blade 252.

As illustrated in the drawings, it is desirable that a leading edge of the main blade 250 is formed in such a manner that the thickness of the main blade 250 gradually decreases going toward an end (in the front direction) of the leading edge of the main blade 250.

For convenience of description, the leading edge of the main blade 250 is hereinafter referred to as an edge that serves as a blade edge. A rear edge of the main blade 250 is defined as meaning an end portion on the other side of the main blade 250 from the blade edge. That is, in FIG. 16, when the main blade 250 is rotated clockwise (when viewed from above) as indicated by an arrow, a blade edge that chops the food into small pieces is referred to as a leading edge, and an end portion on the opposite side of the main blade 250 from the blade edge is referred to as a rear edge that is not in use for chopping the food into small pieces. In this case, in FIG. 20, a left end portion is the leading edge of the main blade 250, and a right end portion thereof is the rear edge of the main blade 250.

In this manner, according to the present disclosure, at least one surface of each of the main and auxiliary blades 250 and 252 is an inclined surface 250c so that the thickness of the main blade 250 gradually decreases going toward an end of inclined surface 250c. That is, it is desirable that the inclined surface 250c is formed at at least one of the leading edge and a rear edge of the main blade portion 250b of the main blade 250.

More specifically, the inclined surface 250c is formed at an upper surface or a lower surface of the main blade portion 250b of the main blade 250 so that the thickness of the main blade 250 gradually decreases going toward an end of the leading edge or the rear edge. That is, the inclined surface 250c is formed at an upper-surface or lower-surface end portion of the main blade portion 250b of the main blade 250 so that the thickness of the main blade 250 gradually decreases going toward an end of the upper-surface or lower-surface end portion.

According to the present embodiment of the present disclosure, in the drawings, a case is illustrated where the inclined surface 250c is formed only at the leading edge of the main blade 250. That is, the inclined surface 250c is formed at a lower-surface leading edge of the main blade portion 250b of the main blade 250 so that a height of the main blade 250 gradually increases going toward (end of the leading edge) of the lower-surface leading edge.

The inclined surface 250c serves to make it easy to chop the food into small pieces and also serves to force the food and fluid to move downward. When the leading edge of the main blade portion 250b of the main blade 250 has the inclined surface 250c, the blade edge is sharp. Thus, the food is easy to chop into small pieces. In addition, when the main blade portion 250b is rotated, the inclined surface 250c inclined downward serves to push the food or the fluid downward.

The main blade portion 250b of the main blade 250 is obliquely formed. Thus, a leading edge part of the main blade portion 250b is configured in such a manner as to have a greater height than a rear edge part thereof. That is, as illustrated in FIG. 20, the main blade portion 250b of the main blade 250 is formed in such a manner that a height of the leading edge (left end portion in FIG. 20) thereof is greater by a predetermined angle γ than a height of the rear edge (right end portion in FIG. 20) thereof.

In this manner, when the main blade portion 250b of the main blade 250 is formed in such a manner that the height of the leading edge thereof is greater by the predetermined angle γ than the height of the rear edge thereof, this structure is effective in the downward pushing of the food by the main blade portion 250b. Thus, chopping and moving of the food occur at the same time, and thus mixing of the food smoothly occurs.

The leading edge or the rear edge of the main blade 250 may be formed in such a manner as to have a concave-convex surface. That is, the leading edge or the rear edge of the main blade portion 250b of the main blade 250 is formed in such a manner as to have a concave-convex surface. The concave-convex portion may be formed on the inclined surface 250c.

According to the present embodiment, a case is illustrated where the concave-convex portion is formed on the leading edge of the main blade portion 250b of the main blade 250.

In this manner, when a concave-convex portion is formed on the leading edge of the main blade portion 250b of the main blade 250, an area of the blade edge with which the food comes into contact is increased, and thus, the efficiency of chopping the food into small pieces is improved. That is, the area of the blade edge of the main blade 250 with which the food comes into contact is increased.

The concave-convex surface may be formed on the leading edge of the main blade portion 250b of the main blade 250 in such a manner as to be rounded with a radius of curvature.

More specifically, one or more concave grooves 256 are formed in the leading edge of the main blade portion 250b of the main blade 250. It is desirable that these concave grooves 256 have the shape of " ⌒ ".

As illustrated, the concave groove 256 has the shape of " ⌒ " when viewed as a whole. The concave groove 256 is configured to include straight-line portion 256a, a curvature portion 256b, and the like. The straight-line portion 256a extends in a straight line. The curvature portion 256b extends from an end portion of the straight-line portion 256a and is rounded with a radius of curvature.

As illustrated, the straight-line portion 256a is obliquely cut inward from the lead edge of the main blade portion 250b. The curvature portion 256b extends from the end portion of the straight-line portion 256a to the leading edge of the main blade portion 250b in a curved manner.

The straight-line portion 256a is formed inward from the main blade portion 250b, that is, toward the main fixation portion 250a. The curvature portion 256b is formed outward from the main blade portion 250b.

In this manner, when the straight-line portion 256a is formed inward from the main blade portion 250b and the curvature 256b is formed outward from the main blade portion 250b, this structure provides an advantage in that the concave groove 256 contributes to effective food chopping and mixing.

Specifically, when the main blade portion 250b of the main blade 250 is rotated, this structure is effective in temporarily trapping the food inside the container body 100 in the concave groove 256 in the concave-convex shape and chopping the trapped food into small pieces. Thus, the efficiency of hopping the food into small pieces is improved. That is, since the concave groove 256 is formed to the shape of " ⌒ ", the curvature portion 256b grabs food that is slid without being chopped in the straight-line portion 256a when the main blade portion 250b is rotated and chops the food into small pieces It is desirable that the straight-line portion 256a of the concave groove 256 is formed in such a manner as to have a length L greater than a length M of the curvature portion 256b. In this manner, when the straight-line portion 256a has a greater length than the curvature portion 256b, the curvature portion 256b is naturally sharply bent outward, and thus has the shape of " ⌒ " when viewed as a whole. Accordingly, the food is prevented from being slid out of the curvature portion 256b.

The concave groove 256 is formed in the inclined surface 250c. That is, the concave groove 256 is formed in the inclined surface 250c formed on the leading edge of the main blade portion 250b of the main blade 250. Thus, the area with which the food comes into contact is increased, and at the same time, the food is reliably chopped into small pieces.

Of course, an inclined surface of a predetermined size is also formed at respective end portions of the straight-line portion 256a and the curvature portion 256b of the concave groove 256. That is, the concave groove 256 also serves as a blade edge. Accordingly, the further an end thereof is positioned, the smaller a thickness thereof. Thus, the concave groove is in the shape of a sharp recess.

Operation of the blender according to the present disclosure that has the configuration as described above will be described below with reference to the accompanying drawings.

The container body 100 is seated on the main body 500 as illustrated in FIG. 1. In this state, the blender according to the present disclosure is ready for use.

First, electric power needs to be supplied from the outside in order to use the blender. It is possible that the wireless electric power module 520 supplies the electric power in a wireless manner. That is, it is possible that the electric power is supplied from the outside using an induced electromotive force. Of course, it is also possible that the electric power is supplied in a wired manner.

The wireless electric power module 520 supplies the electric power to components, such as the motor assembly 600, the touch operation unit 504, and the electric power transmission unit 700, that need the electric power for operating. The user may operate the blender or may stop the blender by operating the touch operation unit 504 or the knob 502.

For example, when the user operates the touch operation unit 504 or the knob 502, the motor assembly 600 operates, the blades of the blade assembly 200 are rotated, and then food is chopped into small pieces.

At this time, the detection system determines whether or not the container lid 400 is attached. In a case where the container lid 400 is not attached, the motor assembly 600 and the blade assembly 200 do not operate.

Specifically, the reed switch 234 is turned off when the blender is not in use. Therefore, the electric power reception unit 220, the reed switch 234, the optical transmission module 810, and the like do not form a closed circuit within the container body 100, and thus light reception does not occur in the optical reception module 820.

In this manner, when the light reception does not occur in the optical reception module 820, with no signal representing the non-occurrence of the light reception, the motor assembly 600 is blocked from receiving electric power.

When the container lid 400 is attached in this state, the permanent magnet 232 of the container lid 400 is positioned in proximity to the reed switch 234, and thus the reed switch 234 is turned on. In return, the electric power reception unit 220, the reed switch 234, the optical transmission module 810, and the like form the closed circuit. Accordingly, the optical reception module 820 receives light that occurs in the optical transmission module 810.

Thus, when it is detected that the container lid 400 is attached, the motor assembly 600 starts to operate according to the user's operation. The food inside the container body 100 is chopped into small pieces. Of course, at this time, it is desirable that the container body detection switch 960 or the like also detects whether or not the container body 100 is mounted on the main body 500 and thus that the motor assembly 600 starts to operate.

At this time, an operating state of the blender according to the present disclosure is displayed on the display unit 506 or the like for being viewed from the outside. Thus, the user may visually recognize the operating state, operation time, and the like of the blender.

When attaching or detaching the container lid 400 on and from the container body 100, the user attaches or detaches the container lid 400 while holding an upper portion of the cap 450 with their hand. The user presses the container lid 400 in a direction of motion from upward to downward, and thus the container lid 400 is brought into contact with the upper surface of the container body 100 and thus is fixed thereto. At this time, the gasket 402 provided on an external surface of the container lid 400 bridges a gap between the container lid 400 and the container body 100.

When with the operation of each of the motor assembly 600 and the blade assembly 200, an operation of chopping food inside the container body 100 into small pieces or an operation of mixing food inside the container body 100 is finished according to the user's intention, the user may lift the container body 100 upward from the main body 500 for being separated therefrom and then may detach the container lid 400 to take the food out of the container body 100.

In addition, the user may separate the cap 450 mounted on the center portion of the container lid 400 from the center portion thereof. The user may perform this separation operation by rotating the cap 450 and thus moving the cap 450 upward while holding the upper end portion thereof with their hand.

When the cap 450 is separated from the container lid body 410, the user may place food into the container body 100 through the cover hole 401 or may stir food inside the container body 100 using a rod or the like.

The blade edge of the blade assembly 200 is configured to include the main blade 250 and the auxiliary blade 252. With this configuration, it is easier to chop food into small pieces and to mix the food.

The detailed configuration of the implementation example of the main blade 250, as described above, is illustrated in FIGS. 16 to 21. With the main and auxiliary blades 250 and 252 having the shape of "⌒", the food-chopping performance of the main and auxiliary blades 250 and 252 is improved.

That is, when the main blade 250 is rotated, the food is trapped in the concave groove 256, and thus is chopped into small pieces without sliding off the blade edge.

The present disclosure is not limited to the embodiments described above. It would be apparent to a person of ordinary skill in the art that various modifications will be made to the embodiments of the present disclosure without departing the scope of the present disclosure.

According to the above-described embodiments, the case is illustrated where the concave groove 256 in the shape of "⌒" is formed in the leading edge of the main blade portion 250b of the main blade 250. However, the concave groove 256 or a concave-convex surface may also be formed in the rear edge of the main blade portion 250b of the main blade 250.

As described above, the concave groove 256 or the concave-convex surface may also be formed in the auxiliary blade portion 252b of the auxiliary blade 252.

The invention claimed is:

1. A blender comprising:
   a container body in which food is accommodated;
   a main body to support the container body;
   a container lid to detachably mount on an upper surface of the container body to open and close a top of the container body; and
   a blade assembly including a blade to chop the food inside the container body into small pieces,
   wherein one or more concave grooves in a shape of "⌒" are formed at one end portion of the blade,
   wherein the one or more concave grooves are formed at an inclined surface of a leading edge of the blade and a thickness of the blade gradually decreases going from a start of the inclined surface toward an end of the inclined surface of the leading edge of the blade.

2. The blender of claim 1, wherein a concave groove of the one or more concave grooves comprises:
   a straight-line portion extending in a straight line; and
   a curvature portion extending from an end portion of the straight-line portion and rounded with a radius of curvature.

3. The blender of claim 2, wherein the straight-line portion is formed in such a manner as to have a greater length than the curvature portion.

4. The blender of claim 1, wherein the blade assembly including the blade comprises:
   a main blade including a plurality of main blade portions; and an auxiliary blade including an auxiliary blade portion positioned between the plurality of main blade portions, wherein the one or more concave grooves are formed at at least one of a main blade portion of the plurality of the main blades and the auxiliary blade portion.

5. The blender of claim 4, wherein the one or more concave grooves are formed at a leading edge, as a blade edge, of the at least one of the main blade portion and the auxiliary blade portion.

6. The blender of claim 5, wherein the main blade portion is obliquely formed so that a leading edge part of the main blade portion has a greater height than a rear edge part thereof.

7. The blender of claim 4, wherein a smaller number of the auxiliary blade portions are provided than the main blade portions.

8. The blender of claim 4, wherein the auxiliary blade portion has a smaller length than the main blade portion.

9. The blender of claim 1, wherein the blade assembly comprises:

a main blade comprising a main fixation portion combined with a blade shaft and a plurality of main blade portions formed at the main fixation portion in a manner that protrudes outward therefrom; and an auxiliary blade comprising an auxiliary fixation portion combined with the blade shaft and a plurality of auxiliary blade portions formed at the auxiliary fixation portion in a manner that protrudes outward therefrom, wherein the one or more concave grooves are formed at at least one of a main blade portion among the plurality of main blade portions and an auxiliary blade portion among the plurality of the auxiliary blade portions.

10. The blender of claim 9, wherein the auxiliary blade portion is positioned between the plurality of main blade portions, and an angle that the auxiliary blade portion and the auxiliary fixation portion make with each other is smaller than an angle that the main blade portion and the main fixation portion make with each other.

11. The blender of claim 10, wherein the auxiliary blade portion is formed in such a manner as to extend upward at an angle with respect to the auxiliary fixation portion from an end of the auxiliary fixation portion.

12. The blender of claim 10, wherein the auxiliary blade portion is formed in such a manner as to extend upward at a greater angle than the main blade portion.

* * * * *